(12) United States Patent
Tretbar et al.

(10) Patent No.: US 12,516,162 B2
(45) Date of Patent: Jan. 6, 2026

(54) SILOXANE EXCHANGE CHEMISTRY FOR VITRIMERS

(71) Applicant: The Regents of the University of California, Oakland, CA (US)

(72) Inventors: Chase Tretbar, Irvine, CA (US); Zhibin Guan, Irvine, CA (US); Jordan A. Castro, Clovis, CA (US)

(73) Assignee: The Regents of the University of California, Oakland, CA (US)

( * ) Notice: Subject to any disclaimer, the term of this patent is extended or adjusted under 35 U.S.C. 154(b) by 604 days.

(21) Appl. No.: 17/857,554

(22) Filed: Jul. 5, 2022

(65) Prior Publication Data

US 2023/0043444 A1     Feb. 9, 2023

Related U.S. Application Data

(60) Provisional application No. 63/218,235, filed on Jul. 2, 2021.

(51) Int. Cl.
| | |
|---|---|
| *C08J 3/24* | (2006.01) |
| *C08F 110/02* | (2006.01) |
| *C08F 110/06* | (2006.01) |
| *C08F 120/14* | (2006.01) |
| *C08L 23/06* | (2006.01) |

(52) U.S. Cl.
CPC .............. *C08J 3/24* (2013.01); *C08F 110/02* (2013.01); *C08F 110/06* (2013.01); *C08F 120/14* (2013.01); *C08L 23/06* (2013.01); *C08J 2323/06* (2013.01); *C08J 2323/12* (2013.01); *C08J 2333/12* (2013.01); *C08L 2205/08* (2013.01);

(Continued)

(58) Field of Classification Search
CPC ................. C08J 3/24; C08K 5/06; C08F 8/42
See application file for complete search history.

(56) References Cited

U.S. PATENT DOCUMENTS

| | | | | |
|---|---|---|---|---|
| 4,182,398 | A | * | 1/1980 | Salyer .................... C09K 5/063 165/104.34 |
| 2009/0126932 | A1 | | 5/2009 | Robinson et al. |
| 2014/0348772 | A1 | | 11/2014 | Goepferich et al. |

FOREIGN PATENT DOCUMENTS

| | | |
|---|---|---|
| CN | 110790958 A | 2/2020 |
| CN | 111454384 A | 7/2020 |

OTHER PUBLICATIONS

Shieh, Journal of Applied Polymer Science, vol. 74, Issue 14, Dec. 1999, pp. 3287-3552 (Year: 1999).*

(Continued)

*Primary Examiner* — Robert C Boyle
(74) *Attorney, Agent, or Firm* — Brooks Kushman P.C.

(57) ABSTRACT

A vitrimer composition includes a first plurality of polymer backbones cross-linked with cross-linkers that include at least one siloxane moiety having formula 1:

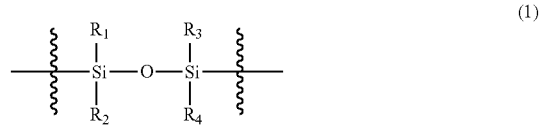

(1)

wherein $R_1$, $R_2$, $R_3$, and $R_4$ are each independently H or $C_{1-6}$ alkyl. A catalyst that accelerates siloxane exchange is dispersed within the first plurality of polymer backbones.

35 Claims, 28 Drawing Sheets

- Hydrolytic stability
- Wide availability
- Self-correcting hydrolysis

- Acid labile
- Irreversible hydrolysis

(52) U.S. Cl.
CPC ..... *C08L 2207/062* (2013.01); *C08L 2312/02* (2013.01)

(56) References Cited

OTHER PUBLICATIONS

Non-Final Office Action dated Aug. 27, 2024, U.S. Appl. No. 17/857,842, filed Jul. 5, 2022, 9 pgs.

Magana, S. et al., "Thermally Reversible Crosslinked Polyethylene Using Diels-Alder Reaction in Molten State," Reactive & Functional Polymers 70 (2010) pp. 442-448.

Barlow, J. W.; Paul, D. R. Polymer Blends and Alloys—a Review of Selected Considerations. Polym. Eng. Sci. 1981, 21 (15), 985-996. https://doi.org/10.1002/pen.760211502.

Bates, F. S. Polymer-Polymer Phase Behavior. Science 1991, 251 (4996), 898-905. https://doi.org/10.1126/science.251.4996.898.

Luciani, A.; Jarrin, J. Morphology Development in Immiscible Polymer Blends. Polym. Eng. Sci. 1996, 36 (12), 1619-1626. https://doi.org/10.1002/pen.10558.

Porter, R. S.; Johnson, J. F. The Entanglement Concept in Polymer Systems. Chem. Rev. 1966, 66 (1), 1-27. https://doi.org/10.1021/cr60239a001.

Kinloch, A. J. Fracture Behaviour of Polymers; Springer Science & Business Media, 2013.

Eagan, J. M.; Xu, J.; Girolamo, R. D.; Thurber, C. M.; Macosko, C. W.; LaPointe, A. M.; Bates, F. S.; Coates, G. W. Combining Polyethylene and Polypropylene: Enhanced Performance with PE/iPP Multiblock Polymers. Science 2017, 355 (6327), 814-816. https://doi.org/10.1126/science.aah5744.

Xu, Y.; Thurber, C. M.; Macosko, C. W.; Lodge, T. P.; Hillmyer, M. A. Poly(Methyl Methacrylate)-Block-Polyethylene-Block-Poly(Methyl Methacrylate) Triblock Copolymers as Compatibilizers for Polyethylene/Poly(Methyl Methacrylate) Blends. Ind. Eng. Chem. Res. 2014, 53 (12), 4718-4725. https://doi.org/10.1021/ie4043196.

Rigby, D.; Lin, J. L.; Roe, R. J. Compatibilizing Effect of Random or Block Copolymer Added to Binary Mixture of Homopolymers. Macromolecules 1985, 18 (11), 2269-2273. https://doi.org/10.1021/ma00153a036.

Blom, H. P.; Teh, J. W.; Rudin, A. I-PP/HDPE Blends. III. Characterization and Compatibilization at Lower i-PP Contents. J. Appl. Polym. Sci. 1996, 61 (6), 959-968. https://doi.org/10.1002/(SICI)1097-4628(19960808)61:6<959::AID-APP10>3.0.CO;2-Q.

Sun, Y. J.; Hu, G.-H.; Lambla, M.; Kotlar, H. K. In Situ Compatibilization of Polypropylene and Poly(Butylene Terephthalate) Polymer Blends by One-Step Reactive Extrusion. Polymer 1996, 37 (18), 4119-4127. https://doi.org/10.1016/0032-3861(96)00229-7.

Wei, B.; Lin, Q.; Zheng, X.; Gu, X.; Zhao, L.; Li, J.; Li, Y. Reactive Splicing Compatibilization of Immiscible Polymer Blends: Compatibilizer Synthesis in the Melt State and Compatibilizer Architecture Effects. Polymer 2019, 185, 121952. https://doi.org/10.1016/j.polymer.2019.121952.

Jannasch, P.; Wesslen, B. Poly(Styrene-Graft-Ethylene Oxide) as a Compatibilizer in Polystyrene/Polyamide Blends. J. Appl. Polym. Sci. 1995, 58 (4), 753-770. https://doi.org/10.1002/app.1995.070580408.

Xu, Y.; Thurber, C. M.; Lodge, T. P.; Hillmyer, M. A. Synthesis and Remarkable Efficacy of Model Polyethylene-Graft-Poly(Methyl Methacrylate) Copolymers as Compatibilizers in Polyethylene/Poly(Methyl Methacrylate) Blends. Macromolecules 2012, 45 (24), 9604-9610. https://doi.org/10.1021/ma302187b.

Brieger, G.; Bennett, J. N. The Intramolecular Diels-Alder Reaction. Chem. Rev. 1980, 80 (1), 63-97. https://doi.org/10.1021/cr60323a004.

Gandini, A. The Furan/Maleimide Diels-Alder Reaction: A Versatile Click-Unclick Tool in Macromolecular Synthesis. Prog. Polym. Sci. 2013, 38 (1), 1-29. https://doi.org/10.1016/j.progpolymsci.2012.04.002.

Aubin, M.; Prud'homme, R. E. Analysis of the Glass Transition Temperature of Miscible Polymer Blends. Macromolecules 1988, 21 (10), 2945-2949. https://doi.org/10.1021/ma00188a010.

Geyer, R.; Jambeck, J. R.; Law, K. L. Production, Use, and Fate of All Plastics Ever Made. Sci. Adv. 2017, 3 (7), e1700782. https://doi.org/10.1126/sciadv.1700782.

A.; Joullie, M.; Spanevello, R.; Suarez, A. Microwave-Assisted Regioselective Cycloaddition Reactions between 9-Substituted Anthracenes and Levoglucosenone. Org. Lett. 2006, 8, 24, 5561-5564. https://doi.org/10.1021/ol062254g.

Reddy, P.; Kondo, S.; Toru, T.; Ueno, Y.; Lewis Acid and Hexamethyldisilazane-Promoted Efficient Synthesis of N-Alkyl- and N-Arylimide Derivatives. J. Org. Chem. 1997. 62(8), 2652-2654. https://doi.org/10.1021/jo962202c.

* cited by examiner

Figure S14.

SILOXANE EXCHANGE CHEMISTRY FOR VITRIMERS

CROSS-REFERENCE TO RELATED APPLICATIONS

This application claims the benefit of U.S. provisional application Ser. No. 63/218,235 filed Jul. 2, 2021, the disclosure of which is hereby incorporated in its entirety by reference herein.

STATEMENT REGARDING FEDERALLY SPONSORED RESEARCH OR DEVELOPMENT

The invention was made with Government support under Contract No. DMR-1810217 awarded by the National Science Foundation (NSF). The Government has certain rights to the invention.

TECHNICAL FIELD

In at least one aspect, the present invention is related to siloxane exchange chemistry in vitrimers.

BACKGROUND

Due to global pressure for a reduction in plastic waste, concentrated effort has been put forth to find materials that have the capacity to meet the rigorous mechanical requirements of crosslinked thermosets while still maintaining re-processability.[1,2] Vitrimers are a relatively new family of polymeric materials containing dynamic crosslinks that exchange under heat and stress. Vitrimers use associative exchange to maintain a fixed crosslink density and prevent network integrity loss at elevated temperatures.[3,4] For this reason, vitrimers are advantageous in applications requiring dimensional stability, increased temperatures, and solvent resistance.[5] Several vitrimer motifs have been explored including transamination of vinylogous urethanes,[6-10] boronic ester or boroxine exchange,[11-16] imine exchange,[17-20] transition metal-catalyzed transesterification,[21-24] olefin metathesis,[25] triazolium transalkylation,[26] acetal exchange,[27,28] siloxane exchange,[29,30] and thiol conjugate addition-elimination.[31] Many of these dynamic chemistries have limitations such as oxidative, thermal, and hydrolytic stability, or difficulty in synthesis which severely limits their application in commercial operation.

Recent work with silyl ether exchange[29,30,32] was demonstrated to have exceptional thermal and oxidative stability, however there was a potential challenge of hydrolytic stability. When exposed to excess moisture and heat, silyl ethers can by hydrolyzed to dimethylsilanol and volatilize during processing.[33] To address this challenge, we have worked towards making use of the analogous siloxane linkage, which is thermally, oxidatively, and hydrolytically stable as well as commercially available in a variety of analogues (FIG. 4.1a).[34] To give a brief comparison between the stability of silyl ether and siloxane motifs, model compounds were synthesized and exposed to 0.01 M HCl at 90° C. (FIG. 4.1b). By monitoring the reaction progress via GC-MS it was found that under dilute acidic conditions, the silyl ether model compound was cleaved within 10 minutes while the siloxane retained much of its integrity over the course of 40+ hours. While it is possible for the siloxane model compound to be hydrolyzed, the resulting silanol can easily condense to re-form the siloxane linkage at high temperatures.[34,35]

Accordingly, there is a need for improved chemistries for vitrimer formation.

SUMMARY

In at least one aspect, a vitrimer composition is provided. The vitrimer composition includes a plurality of polymer backbones that are cross-linked with cross-links that include at least one siloxane moiety having formula 1:

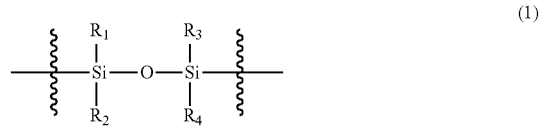

(1)

wherein $R_1$, $R_2$, $R_3$, and $R_4$ are each independently H or $C_{1-6}$ alkyl. The vitrimier composition also includes a catalyst that accelerates siloxane exchange dispersed within the plurality of polymer backbones.

In another aspect, a method for forming a vitrimer composition is provided. The method includes steps of providing a polymer composition that includes a plurality of polymer backbones and cross-linking the plurality of polymer backbones with a cross-linking agent to form cross-links. The cross-linking agent and the cross-links including a siloxane moiety having formula 1:

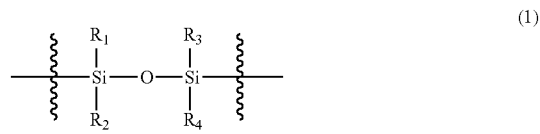

(1)

wherein $R_1$, $R_2$, $R_3$, and $R_4$ are each independently H or $C_{1-6}$ alkyl. A catalyst that accelerates siloxane exchange is dispersed within the plurality of polymer backbones.

In another aspect, the cross-linkers used in vitrimer composition provide a large degree of hydrolytic resistance while retaining oxidative and thermal stability.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1A:
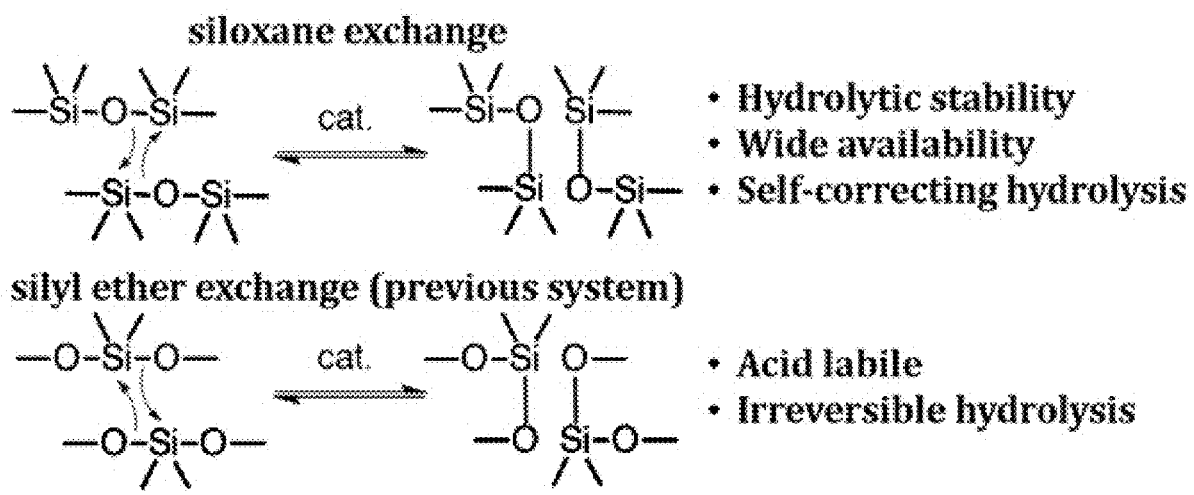
FIG. 1. Reversible siloxane exchange. (a) Comparison between the current siloxane exchange and previous silyl ether exchange. (b) Comparison between siloxane and silyl ether model compounds in the presence of a dilute acid and water.
Figure 1B:
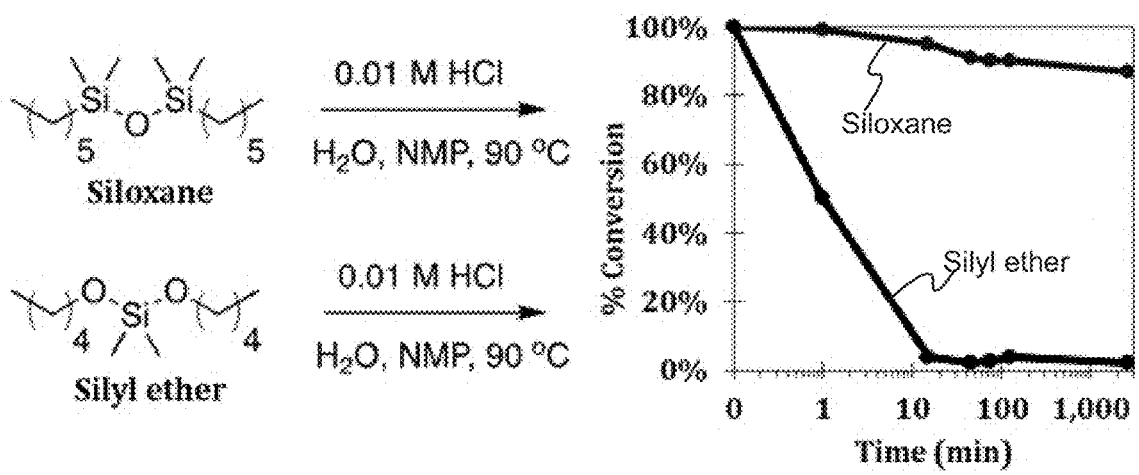

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, alylaryl (e.g., $C_{1-8}$ alkyl $C_{6-10}$ aryl), $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and L is a negatively charged counter ion; R groups on adjacent carbon atoms can be combined as $-OCH_2O-$; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'' and R''' are $C_{1-10}$ alkyl or $C_{6-18}$ aryl groups, $M^+$ is a metal ion, and L is a negatively charged counter ion; hydrogen atoms on adjacent carbon atoms can be substituted as $-OCH_2O-$; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}{}^+O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

The term "acrylate" means esters of acrylic acid,

The term "methacrylate" means esters of methacrylic acid.

The term "(meth)acrylate" means both acrylic acid esters and methacrylic acid esters.

Throughout this application, where publications are referenced, the disclosures of these publications in their entireties are hereby incorporated by reference into this application to more fully describe the state of the art to which this invention pertains.

In an embodiment, a vitrimer composition is provided. The vitrimer composition includes a plurality of polymer backbones that are cross-linked with cross-links that include at least one siloxane moiety having formula 1:

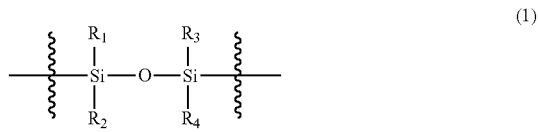

(1)

wherein $R_1$, $R_2$, $R_3$, and $R_4$ are each independently H or $C_{1-6}$ alkyl. Sometimes "cross-links" can be referred to as "cross-linkers." The vitrimer composition also includes a catalyst that accelerates siloxane exchange dispersed within the plurality of polymer backbones. It should be appreciated that siloxane exchange typically increases as the temperature increases. As usual for a catalyzed reaction, the reaction rate follows Arrhenius behavior with an apparent activation energy. For at least some compositions, the exchange becomes so slow at certain low temperatures (e.g., at 25° C. or lower) that the polymer composition behaves like a traditional crosslinked polymer.

In a variation, the plurality of polymer backbones is provided from a plurality of polymer compositions with differing chemical formulations where each polymer composition includes a portion of the plurality of polymer backbones.

It should be appreciated that useful catalysts include any catalyst that accelerates siloxane exchange. Examples of useful catalysts include but are not limited to BrØnsted acids, Lewis acids, organic or inorganic bases, and complexes of a fluoride salt with a chelating ligand. In a variation, the catalyst includes a complex of a fluoride salt with a chelating ligand. In some refinements, the chelating ligand is a crown ether. Examples of crown ethers include but are not limited to dibenzo-18-crown-6, dibenzo-21-crown-7, dibenzo-24-crown-8, and dibenzo-30-crown-10. In a refinement, the crown ethers can include one or more phenyl groups or one or more benzo groups. It should be appreciated that the optimal selection of the crown ether will be determined by the size of the fluoride salt and in particular the size of the metal ion in the fluoride salt. For example, larger metals are best accommodated by larger crown ethers. A particularly useful catalyst includes a complex of potassium fluoride with a 18-crown-6 crown ether. In a refinement, the fluoride catalyst (e.g., the fluoride salt) is present at the level from about $1\times10^{-6}$ to about $1\times10^{-4}$ mol/g.

In a variation, each cross-linker or a subset of the cross-linkers includes a plurality of siloxane moieties having formula 1:

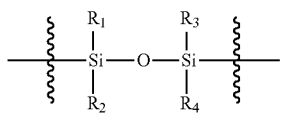
(1)

wherein $R_1$, $R_2$, $R_3$, and $R_4$ are each independently H or $C_{1-6}$ alkyl.

In another variation, each cross-linker or a subset of the cross-linkers include one or more siloxane-containing moieties having formula 2:

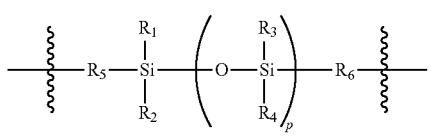
(2)

$R_1$, $R_2$, $R_3$, and $R_4$ are each independently H or $C_{1-6}$ alkyl; and
$R_5$ is $(CH_2)_n$ or $(CH_2)_nO$;

$R_6$ is $(CH_2)_m$ or $O(CH_2)_m$;
n, m are independently 0 to 10; and
p is 1 to 100.

In a variation, the cross-links are present in an amount from at least 0.1 to 10 weight percent of the total weight of the plurality of polymer backbones. In a refinement, the cross-links are present in an amount from at least 1 to 8 weight percent of the total weight of the plurality of polymer backbones. In some refinement, the cross-links are present in an amount of at least in increasing order of preference 0.05 weight percent, 0.1 weight percent, 0.5 weight percent, 1 weight percent, 3 weight percent, or 5 weight percent of the total weight of the plurality of polymer backbones. In further refinements, the cross-links are present in an amount of at most in increasing order of preference 15 weight percent, 12 weight percent, 10 weight percent, 8 weight percent, 7 weight percent, or 6 weight percent of the total weight of the plurality of polymer backbones.

In another variation, the cross-links are present with a density of siloxane moieties from about $1\times10^{-5}$ to about $1\times10^{-3}$ mol/g. In a refinement, the cross-links are present with a density of siloxane moieties from about $1\times10^{-4}$ to about $5\times10^{-4}$ mol/g.

In a variation, the polymer backbone in the plurality of polymer backbones is composed of a thermoplastic polymer. For example, the thermoplastic polymer includes a component selected from the group consisting of polyolefins, acrylic polymers, polystyrene polymers, polyester polymers, polyurethane polymers, polyamide polymers, and copolymers thereof. In a refinement, the thermoplastic polymer includes a high-density polyethylene.

In another variation, each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3, 3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-heptadecafluorodecyl acrylate, 1H,1H,5H-octafluoropentyl acrylate, 1H,1H,3H-tetrafluoropropyl methacrylate, hexafluoro-isopropyl, 1H,1H,3H-hexafluorobutyl methacrylate, 1H,1H, 5H-octafluoropentyl methacrylate, 1-butylene, 2 butylene, vinyl acetate, dimethyl siloxane, methyl vinyl siloxane, and combinations thereof. In a refinement, each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, and combinations thereof. In a refinement, the thermoplastic polymer includes a high-density polyethylene. In another refinement, the thermoplastic polymer includes a low-density or a linear low-density polyethylene. In still another refinement, the thermoplastic polymer includes a polypropylene. Examples of polypropylene includes an isotatic, syndiotactic, or atatic polypropylenes.

In another embodiment, a method for forming a vitrimer composition is provided. The method includes steps of providing a polymer composition that includes a plurality of polymer backbones and cross-linking the plurality of polymer backbones with a cross-linking agent to form cross-links. As set forth above, the cross-linking agent and the cross-linkers including a siloxane moiety having formula 1:

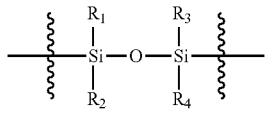
(1)

wherein $R_1$, $R_2$, $R_3$, and $R_4$ are each independently H or $C_{1-6}$ alkyl. A catalyst that accelerates siloxane exchange is dispersed within the plurality of polymer backbones. The crosslinks are formed by various chemistries including radical grafting, nucleophilic substitution, and addition reactions. In a refinement, the crosslinks are formed by radical-induced grafting. In a refinement, the cross-linking agent, and the catalyst is subjected to reactive extrusion to form the cross-links.

In one variation, the polymer backbones include leaving groups and the cross-linking agent includes nucleophilic groups attached thereto such that a reaction between the leaving groups and the nucleophilic groups forms the cross-linkers. In another variation, the polymer backbones include nucleophilic groups and the cross-linking agent includes leaving groups attached thereto such that a reaction between the leaving groups and the nucleophilic groups forms the cross-linkers.

As set forth above, each cross-link or a subset of the cross-links includes a plurality of siloxane moieties having formula 1:

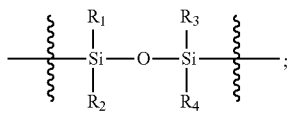
(1)

and
$R_1$, $R_2$, $R_3$, and $R_4$ are each independently H or $C_{1-6}$ alkyl.
In a variation, each cross-link or a subset of the cross-links include one or more siloxane-containing moieties having formula 2:

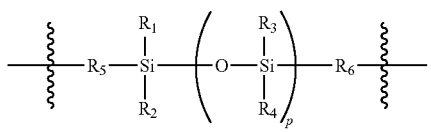
(2)

$R_1$, $R_2$, $R_3$, and $R_4$ are each independently H or $C_{1-6}$ alkyl; and
$R_5$ is $(CH_2)_n$ or $(CH_2)_nO$;
$R_6$ is $(CH_2)_m$ or $O(CH_2)_m$;
n, m are independently 0 to 10; and
p is 1 to 100.

With respect the method, detail for the catalyst and plurality of polymer backbones are the same as set forth above.

The following examples illustrate the various embodiments of the present invention. Those skilled in the art will recognize many variations that are within the spirit of the present invention and scope of the claims.

Results and Discussion

Figure 2A:
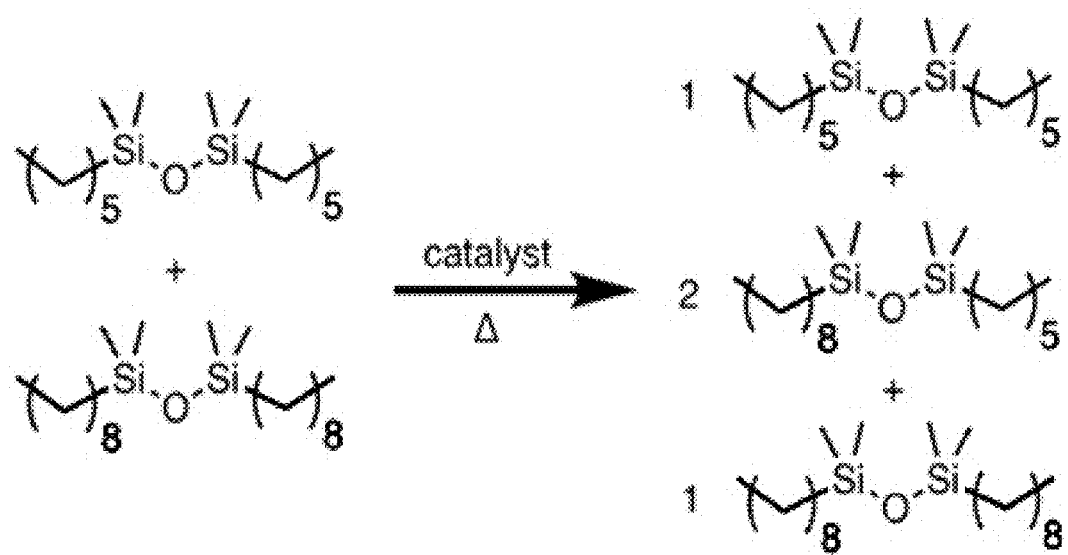
FIGS. 2A, 2B, 2C, 2D, 2E, and 2F. Catalyzed siloxane exchange. (A) Dihexyltetramethyldisiloxane and dinonyltetramethyldisiloxane converted to a statistical distribution of products. (B) Gas Chromatography-Mass Spectrometry (GC-MS) chromatogram of siloxane model compound exchange. Percent completion for the siloxane scrambling reaction (33% w/v) catalyzed at different temperatures by (C) 2 mol % camphorsulfonic acid, (D) 2 mol % scandium (III) triflate (E) 2 mol % N-tetrabutyl ammonium difluorotriphenylsilicate (TBAT), (F) 2 mol % potassium fluoride: dibenzo 18-crown-6 ether (KF:DB18-c-6).
Figure 2B:
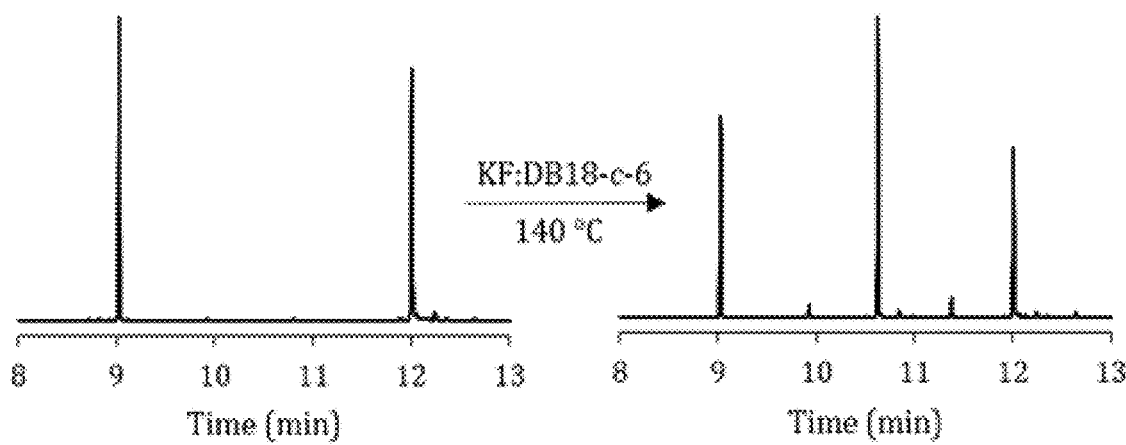
Figure 2C:
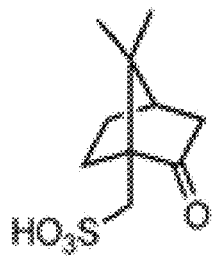
Figure 2C:
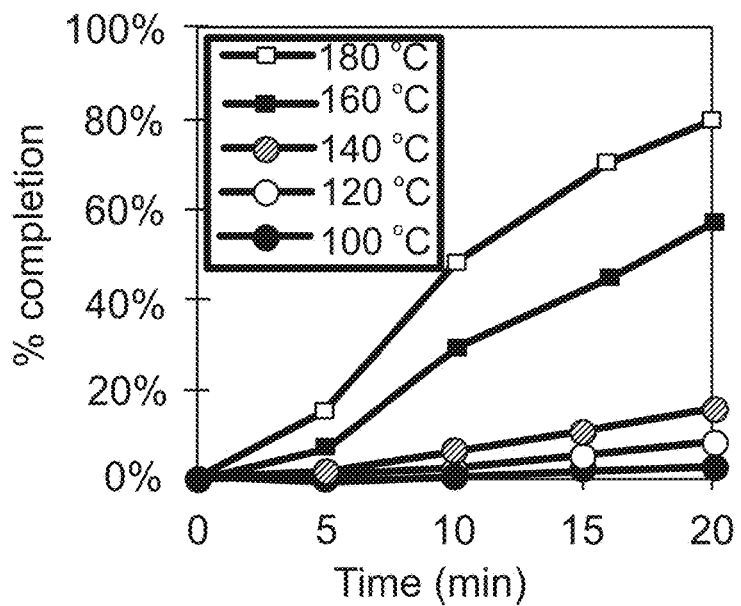
Figure 2D:
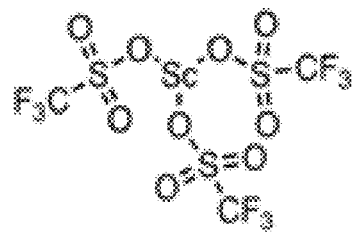
Figure 2D:
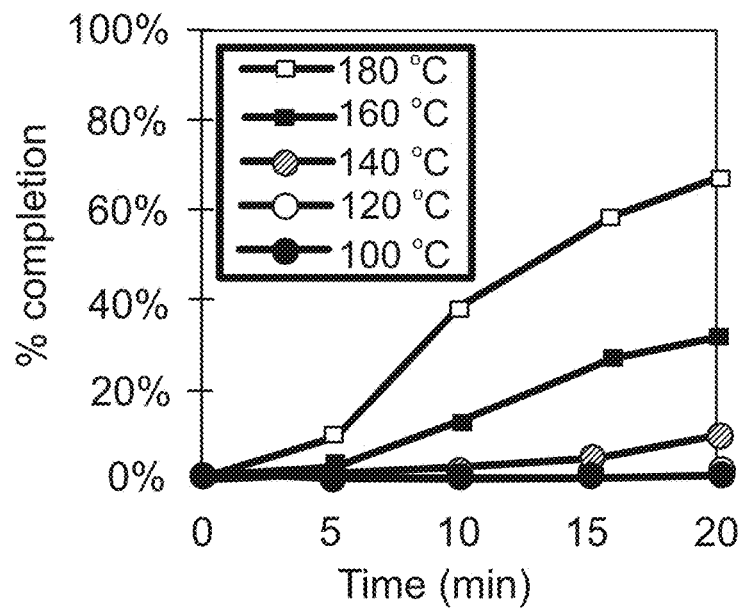

While the Si—O bond is inert to a wide variety of functional groups, it was found that both Brønsted and Lewis acids can promote Si—O exchange in silyl ether model studies.[30] We aimed to determine if these catalysts had similar reactivity towards siloxanes. Model compound studies explored the exchange of dihexyldisiloxane and dinonyldisiloxne alkoxy groups in the presence of 2 mol % catalyst. Under exchange, a new compound consisting of the combination of the two emerges in a statistical 1:2:1 distribution (FIG. 2A,B). For both camphorsulfonic acid and Sc(III)OTf$_3$ (FIG. 2C,D), relatively rapid exchange occurred above 160° C. indicated they would be a viable candidates for vitrimer exchange studies. The mild Lewis acid catalyst Zn(II)OTf$_2$ was also found to facilitate exchange, albeit at a slower rate, suggesting that a wider variety of transition metal catalysts might also promote siloxane exchange—each with different levels of catalytic activity. Unfortunately, many transition metal catalysts have poor solubility in nonpolar matrices and unwanted side reactions with sensitive functional groups which limit the scope of their application.

For these reasons, we began searching for a more selective catalyst for siloxane exchange. Turning our focus towards motifs that interact strongly with silicon, we began exploring fluoride-containing compounds as a possible reaction catalyst. Fluoride has a strong affinity to silicon such that the Si—F bond in SiF$_4$ has the highest BDE of any single bond.[36] Despite the high BDE, the Si—F bond is very ionic—in fact, the difference in electronegativity of Si—F is higher than that of Na—Cl.[37] As such, it has been shown that fluoride can participate in the reorganization of POSS cages without forming irreversible linkages.[38-40] We envision that while strong, the Si—F bond can also be transient, moving from silicon to silicon and modifying the reactivity of the siloxane linkage. To this end, several potential catalysts were explored to facilitate siloxane exchange. Fluoride sources included tetrabutylammonium fluoride (TBAF), tetramethylammonium fluoride (TMAF), tetrabutylammonium triphenyldifluorosilicate (TBAT), potassium fluoride (KF), potassium fluoride coordinated to dibenzo-18-crown-6 ether (KF: DB18-c-6), cesium fluoride, sodium monofluorophosphate, XtalFluor-E, XtalFluor-M, and potassium tetrafluoroborate.

Figure 2E:
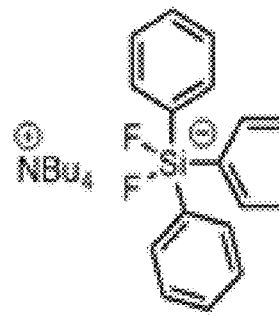
Figure 2E:
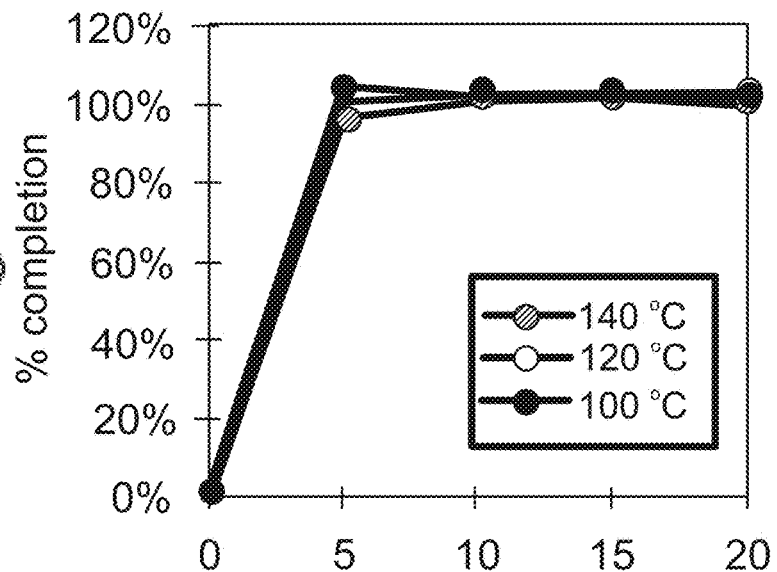
Figure 2F:
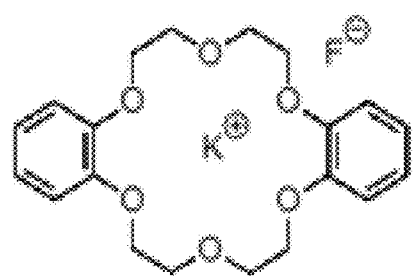
Figure 2F:
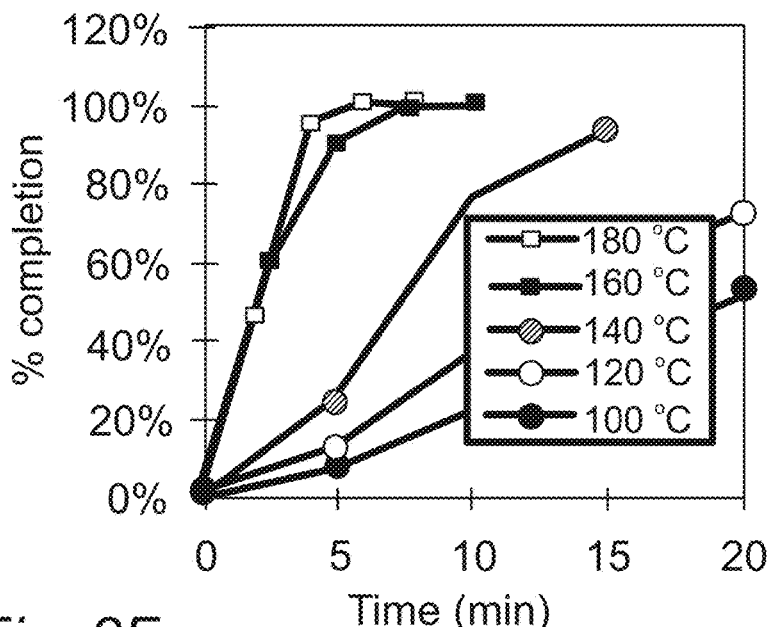

The naked fluoride anion, TBAF and TMAF, offered extremely fast reaction rates at low temperatures. Unfortunately, above 100° C. the solution browned, and subsequent additions of siloxane starting material did not change the composition—indicating the catalyst had degraded during the initial heating. TBAT (FIG. 2E) offers an interesting alternative to TBAF in that the fluoride is already bound to a silicon atom. TBAT offered rapid exchange rates, however also degraded at temperatures above 100° C., albeit at a slower than TBAF. Several other catalysts were screened that did not have sufficient solubility such as NaF, sodium monofluorophosphate, KF, and CsF. Electrophilic fluorine sources such as Xtalfluor-E/M also had no effect on the exchange rate. To increase the solubility and nucleophilicity of the alkali metal fluoride, dibenzo-18-crown-6 ether and KF were prepared in a 1:1 ratio to coordinate to the potassium ion and increase solubility (FIG. 2F). When added to the model siloxanes exchange occurred rapidly with a strong temperature dependence. The stabilization of the potassium ion appears to have a significant impact on the ability of the fluoride to participate in siloxane exchange. The KF:DB-18-c-6 species reached ~95% conversion within 5 minutes at 160° C. and was thermally stable for all tested conditions. The solubility and/or dispersibility of the catalyst is a critical requirement for use in solvent-free applications such as bulk polymer crosslink exchange.

Figure 3:
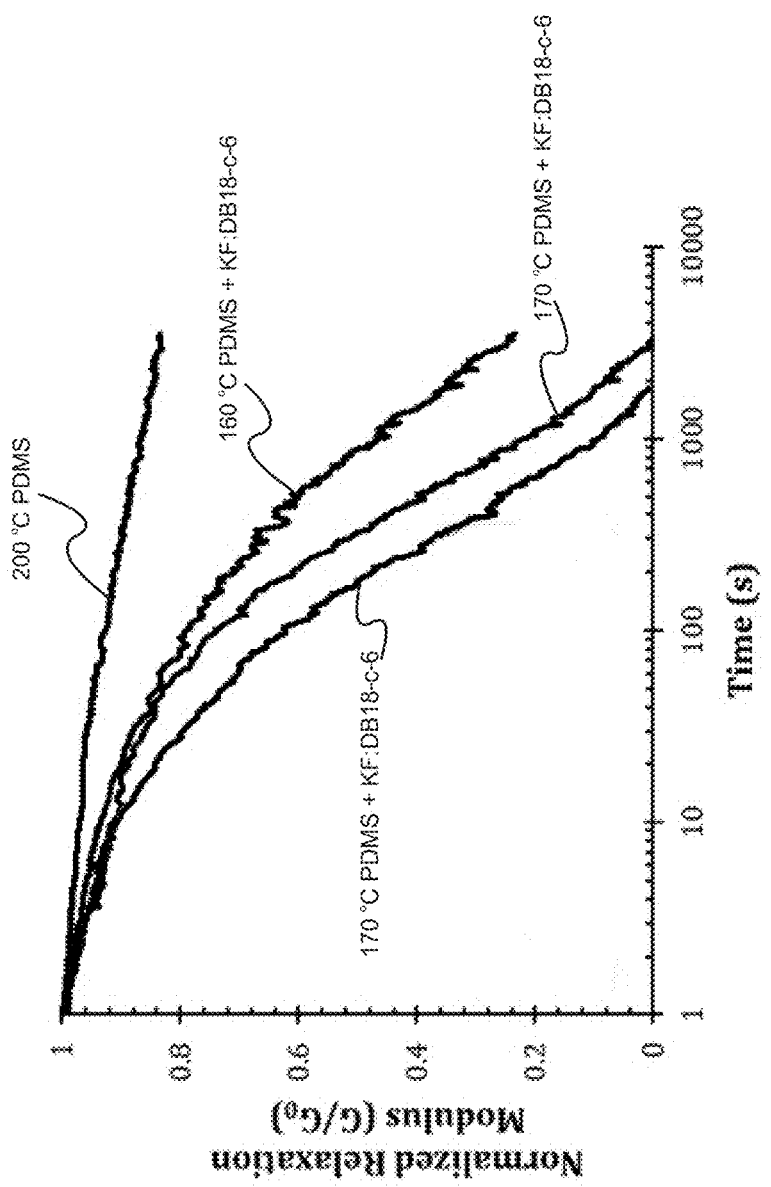
FIG. 3. KF:DB18-c-6 incorporation at 0.1 mmol/g into PDMS elastomer induces malleability when monitored by stress relaxation experiments. At higher temperatures, the the catalyzed PDMS relaxes stress faster. PDMS without catalyst at 200° C. only shows a slight dissipation of stress.
Figure 3:
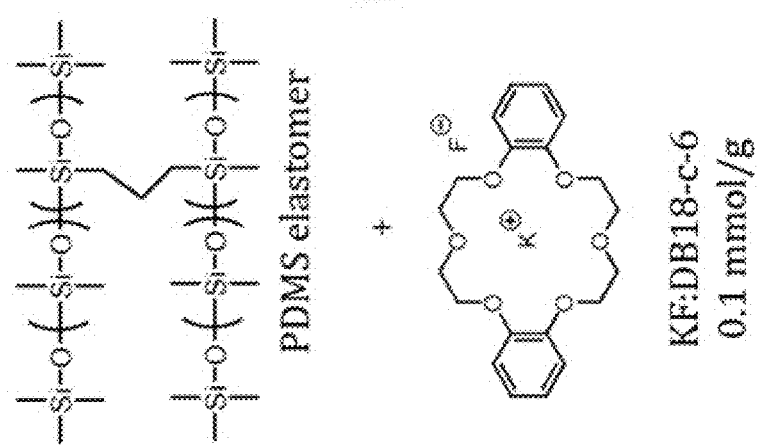

Following small molecule studies, we aimed to probe the fluoride catalyst behavior in polymeric materials. The most common siloxane-containing materials to explore are polydimethylsiloxane (PDMS) elastomers, which contain only Si—O bonds throughout the backbone. PDMS elastomers are normally tough and resistant to creep, however upon the addition of fluoride catalyst became malleable at high temperatures (FIG. 3). The catalyst KF:DB-18-c-6 was dispersed into a 2-part PDMS elastomer kit (Dow® Sylgard 184) at 0.1 mmol per gram polymer under high-speed mechanical mixing. The PDMS was cured at room temperature and punched into disks. Using stress relaxation measurements to monitor the network malleability, the PDMS with catalyst was able to quickly dissipate stress above 160° C. owing to the embedded fluoride. The comparable uncatalyzed PDMS elastomer retained its integrity and was slow to dissipate the applied stress. The apparent $E_a$ for the catalyzed PDMS exchange was ~138 kJ/mol and relaxation behavior followed an Arrhenius temperature dependence, which is indicative of associative exchange chemistries.

With evidence that fluoride is an efficient catalyst for siloxane exchange, we aimed to prepare polymer networks bearing siloxane crosslinks that can undergo exchange and retain malleability. There has been little attention towards the incorporation of vitrimer chemistries into commodity plastics despite the dramatic improvements they could provide. As such, we aimed to broaden the scope of siloxane exchange from PDMS elastomers into high-volume commercial polymers using reactive extrusion. With a generalizable preparation process in mind, we aimed to generate vitrimers using siloxane linkages for high density polyethylene (HDPE-v) and polymethylmethacrylate (PMMA-v). We use the high shear rate and high temperatures of a compounding twin-screw extruder to add functionality to polymer backbones in a scalable manner through either trans amination or radical grafting.

Figure 4A:
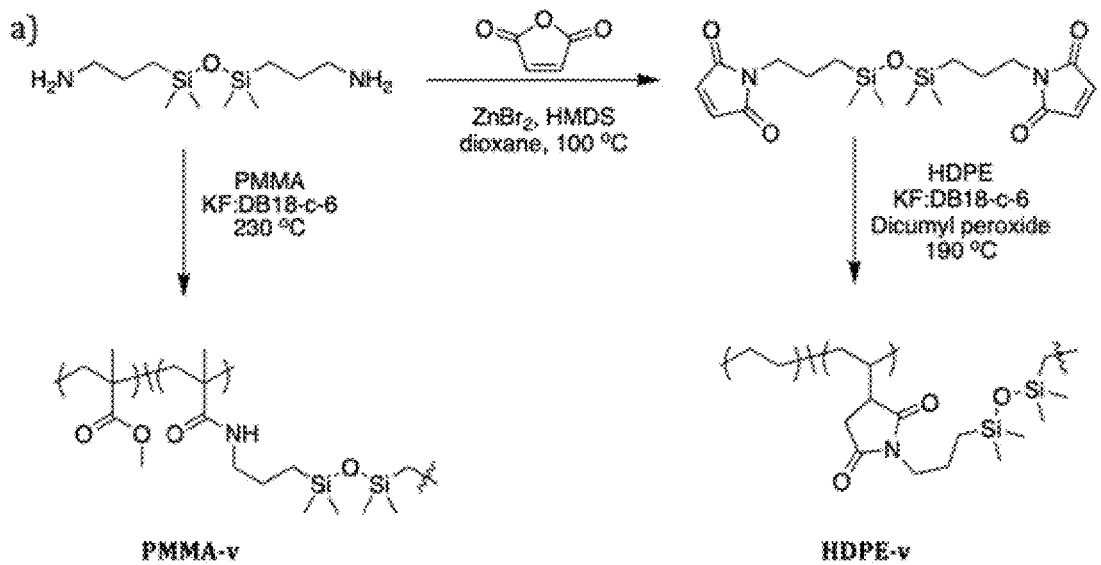
FIGS. 4A, 4B, and 4C. Preparation of siloxane-bearing vitrimers. (A) Synthesis of crosslinker, preparation of PMMA-v, and preparation of HDPE-v. (B, C) Images of PMMA-v and HDPE-v before and after addition of excess TBAF, indicating that crosslinking is formed through siloxane bridges only.
Figure 4B:
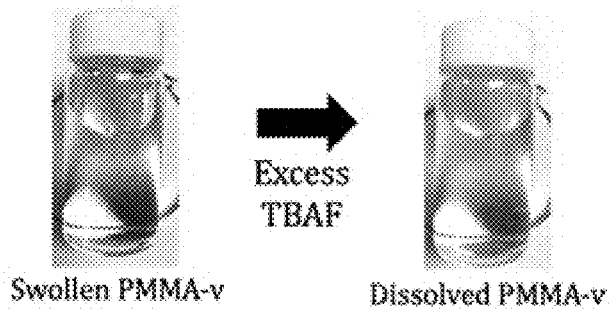
Figure 5A:
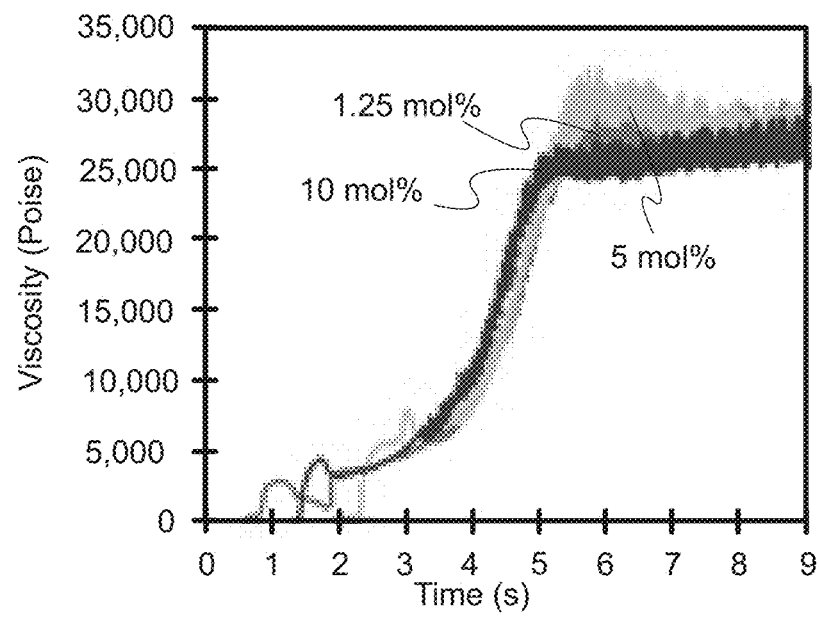
FIGS. 5A, 5B, 5C, 5D, 5E, and 5F. Physical testing of PMMA-v and HDPE-v. (A) Viscosity evolution during extrusion of PMMA-v with 4 wt % diaminosiloxane crosslinker at 230° C. (B) Stress relaxation of PMMA-v with 4% diamine crosslinker at 180° C. and 1% strain using different catalyst concentrations. (C) Tensile testing of unmodified HDPE and HDPE-v over three reprocessing cycles. (D) Stress relaxation of HDPE-v at different temperatures. (E) Arrhenius treatment of HDPE-v stress relaxation. (F) DMTA temperature sweep of unmodified HDPE and HDPE-v showing plateau of modulus above the $T_m$.

PMMA was easily functionalized by the commercially available 1,3-bis(3-aminopropyl)tetramethyldisiloxane through melt blending in the presence of KF:DB-18-c-6 catalyst (FIG. 4A). The primary amines in 1,3-bis(3-aminopropyl)tetramethyldisiloxane react via transamidation with the methyl ester in the PMMA side chains, generating siloxane bridges that can undergo exchange in the presence of fluoride catalyst. Our compounding extruder has a recirculating channel that allows for extended run times to more accurately mimic large-scale extruders. As such, the reaction progress can be monitored through the viscosity evolution over the course of the run. As transamination occurs, the polymers first undergo chain extension followed by crosslinking into a dense network. Owing to rapid fluoride-catalyzed exchange, the crosslinked networks are not destroyed by the high shear of the extruder and instead reach a steady exchange rate that is observed by a plateau in viscosity after all available amine has been consumed (FIG. 5A). At 190° C. the viscosity reaches plateau after approximately 13 minutes, however at 230° C. the viscosity reaches plateau after only 3 minutes of mixing. The difference in the time to reach plateau is caused by the faster rate of amine consumption at the higher temperatures. When an analogous $C_8$-diamine without the siloxane bridge was used, the extruder torque never plateaued and continued to climb until the 14-minute mark where the extruder pressure limit was reached—indicating the dynamic crosslinks play in integral role in the homogenous mixing and processing of crosslinked vitrimers. After removal from the barrel, the $C_8$-diamine crosslinked PMMA was not moldable at any temperature and was insoluble in good solvents. After swelling, the PMMA-v would completely dissolve upon the addition of excess TBAF (FIG. 4B), while the $C_8$-diamine crosslinked network remained an insoluble gel.

TABLE 1

PMMA-v crosslinking conditions.

| Temp. | Crosslinker wt % | Max viscosity | Insoluble % |
|---|---|---|---|
| 190° C. | 5 wt % | 13 minutes | 82.3% ± 6.1% |
| 190° C. | 2 wt % | 13 minutes | 93.7% ± 6.4% |
| | $C_8$-diamine | | |
| 230° C. | 5 wt % | 3 minutes | 84.7% ± 2.1% |
| 230° C. | 4 wt % | 3 minutes | 84.5% ± 1.4% |
| 230° C. | 3.5 wt % | 3 minutes | 80.2% ± 0.4% |
| 230° C. | 2 wt % | 4 minutes | 70.2% ± 1.8% |
| 230° C. | 1 wt % | 5 minutes | 40.7% ± 4.0% |

Figure 5B:
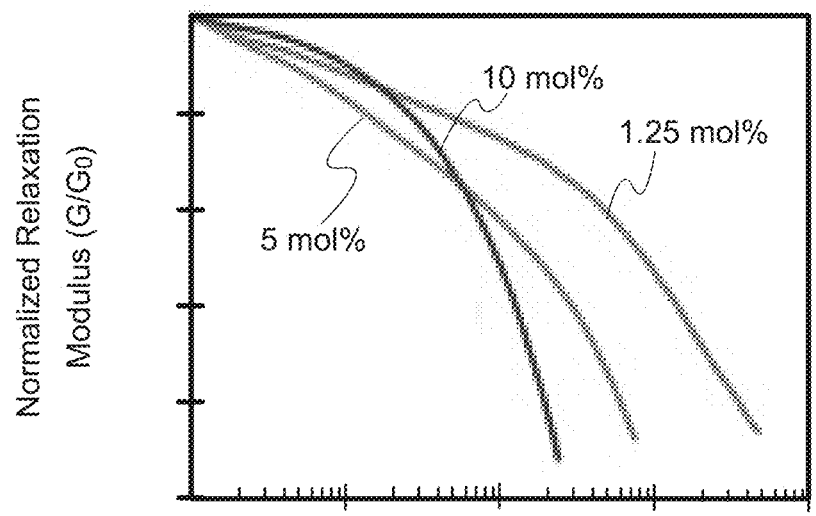

To explore the influence of the fluoride catalyst on the exchange reaction, the molar ratio of catalyst in PMMA-v was varied at 1, 5, and 10 mol % relative to diaminosiloxane crosslinker. The viscosity quickly increased after complete addition of the mixture into the feed hopper and plateaued at ~5 minutes (FIG. 5A). The melt viscosity at plateau was comparable for all samples, indicating all samples were at full conversion. Despite similar viscosity during extrusion, stress relaxation experiments of the sample with 10 mol % catalyst showed faster relaxation than the 5 and 1.25 mol % (FIG. 5B). This also indicates the relaxation behavior is directly related to the fluoride-catalyzed siloxane exchange, and the exchange rate can be tuned by the addition of catalyst.

Figure 4C:
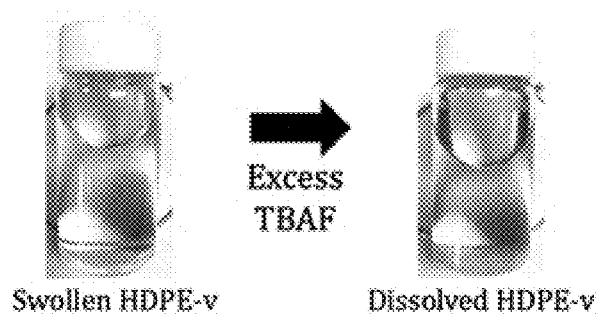

A radical graft-to process was utilized to produce HDPE-v. For the radical crosslinker, 1,3-bis(3-aminopropyl)tetramethyldisiloxane was converted to a bis-maleimide through a ring-opening and closing of maleic anhydride (FIG. 4A). The maleimide is a good radical acceptor and grafting agent for polyolefin functionalization. The bis-maleimidotetramethyldisiloxane was blended with HDPE (MFI=2.2 g/10 min), dicumyl peroxide, and KF:DB-18-c-6 catalyst. The blend was vigorously mixed, and melt blended at 190° C. for five minutes until the peroxide initiator had been sufficiently consumed. After extrusion, the samples were compression molded for mechanical testing. Molded samples had a constant gel fraction of ~45% regardless of the number of reprocessing cycles. To test if HDPE-v had been crosslinked with only siloxane crosslinks, a small piece was swollen in hot xylene. A large excess of TBAF was added to the swollen sample and the insoluble gel completely dissolved as the siloxane bonds were cleaved (FIG. 4C).

Figure 5C:
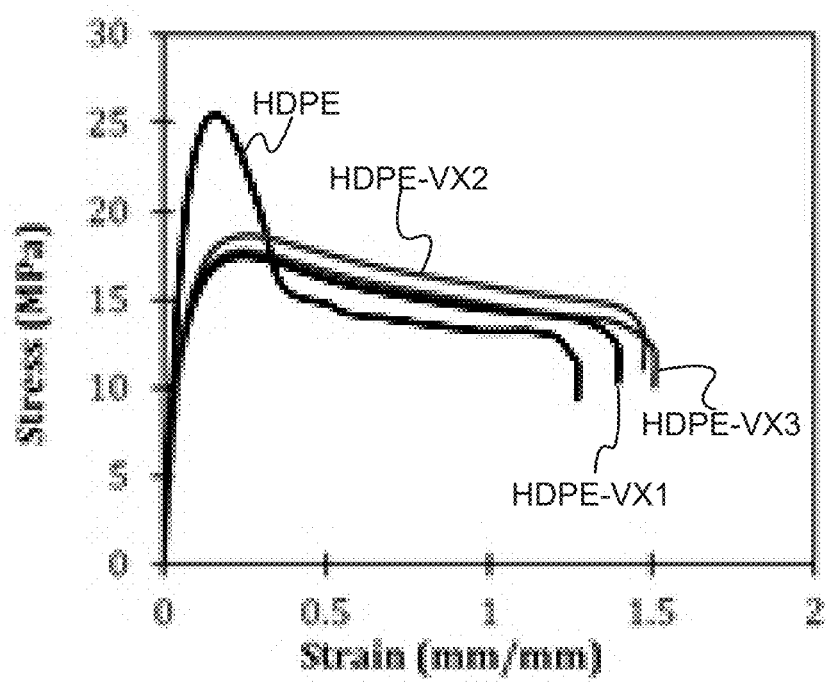
Figure 5D:
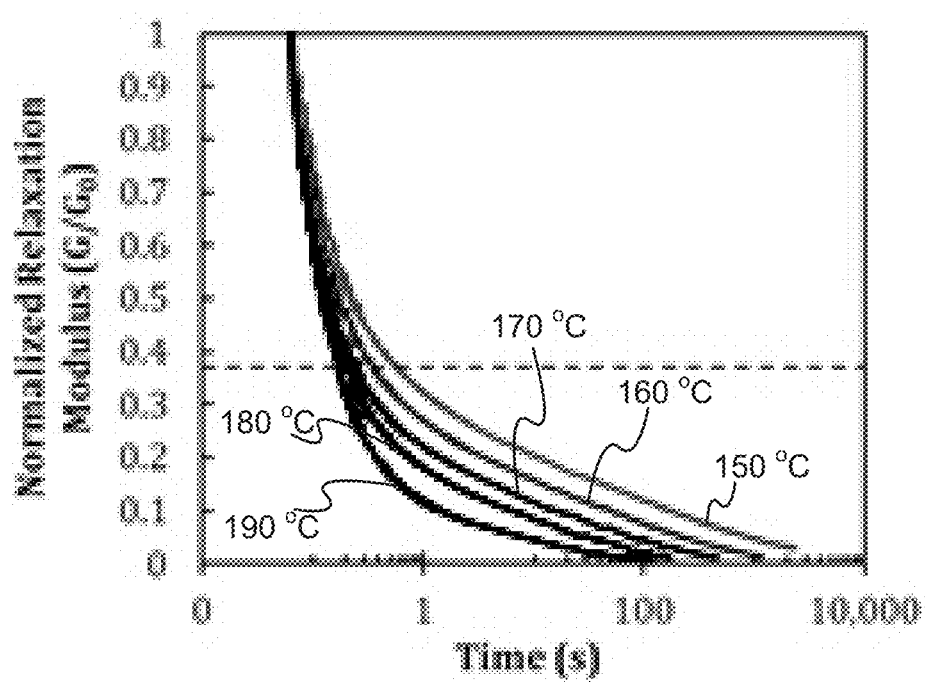
Figure 5E:
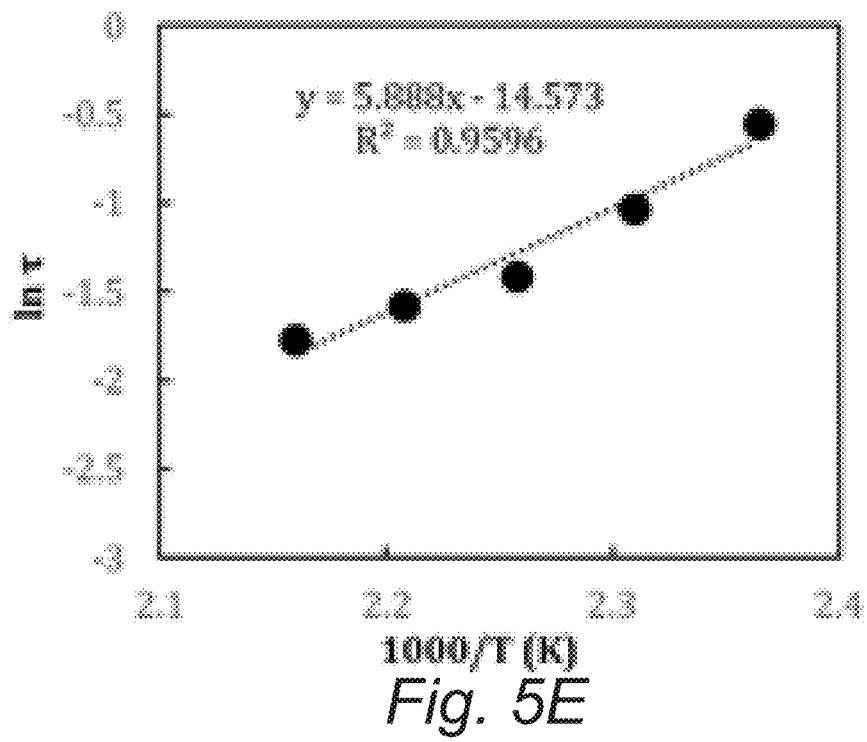
Figure 5F:
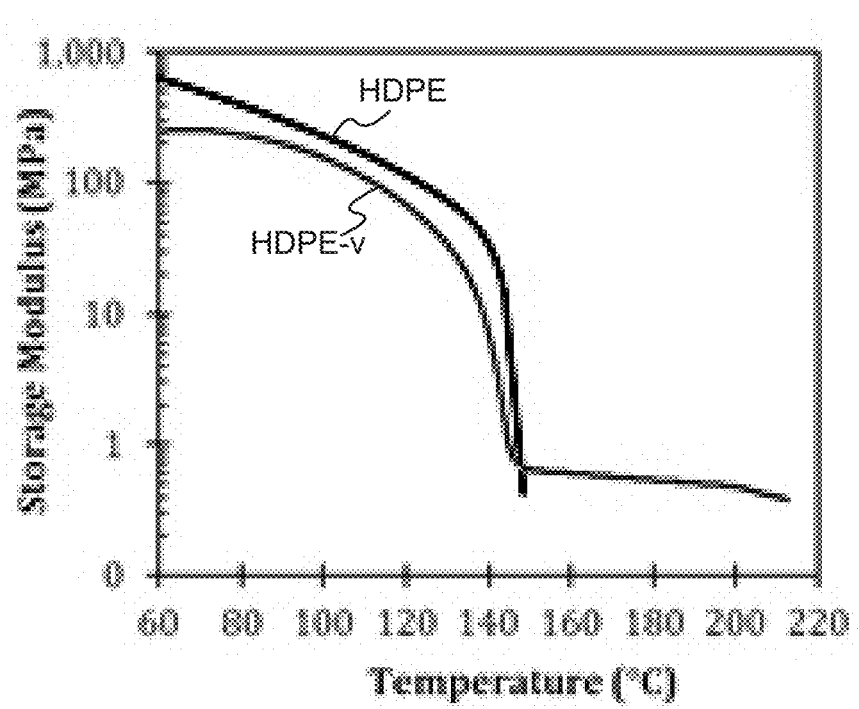
Figure 9:
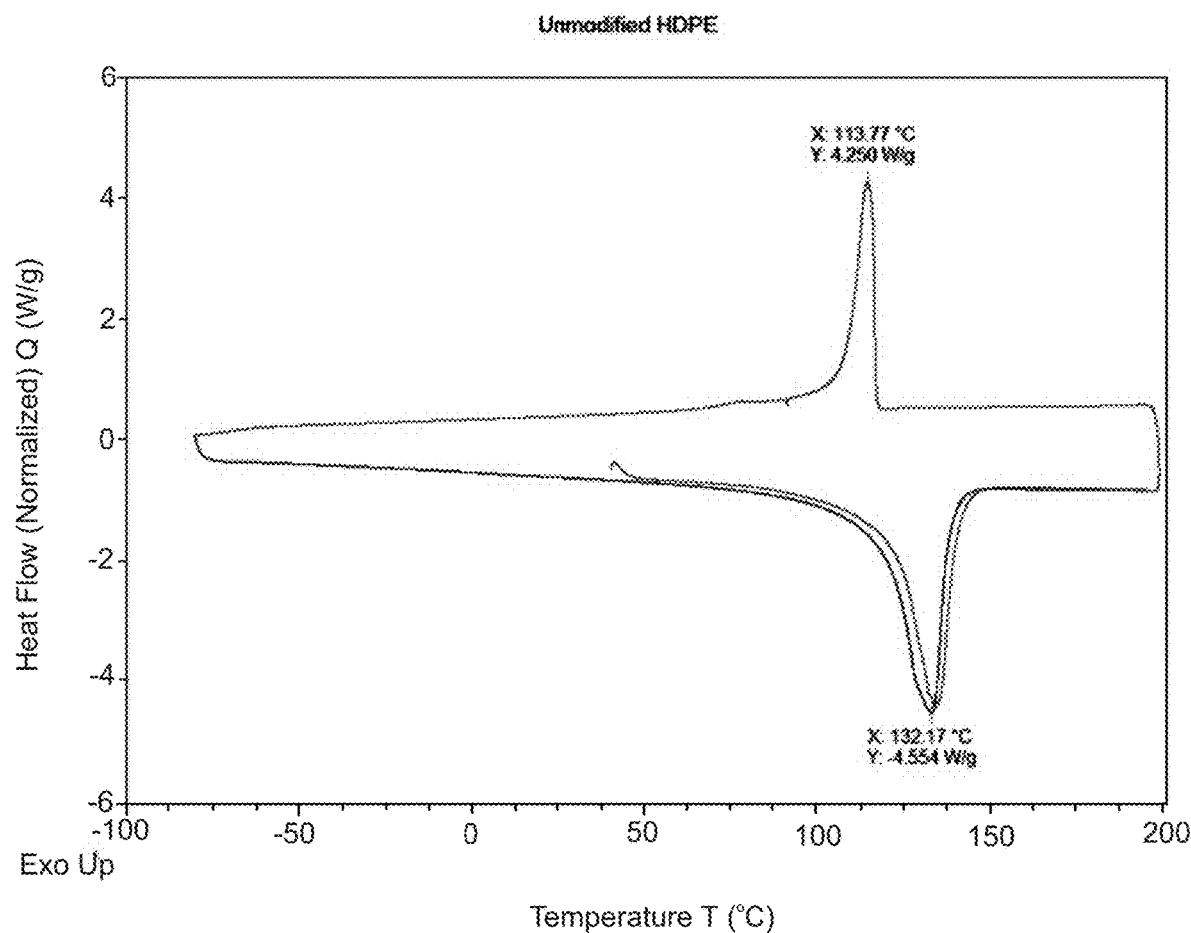
FIG. 9. DSC thermogram of unmodified HDPE.
Figure 10:
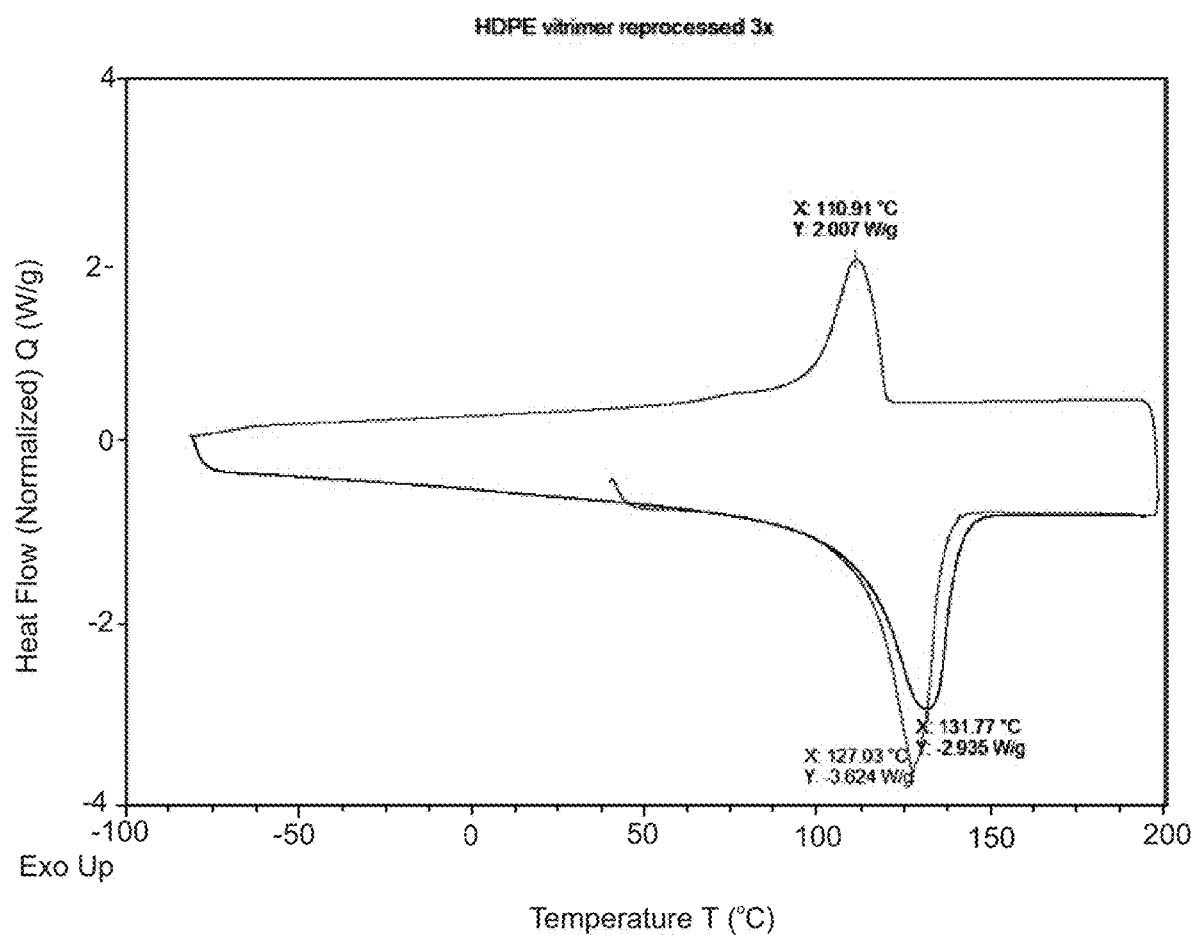
FIG. 10. DSC thermogram of HDPE-v after three reprocessing cycles.

To show the reprocessability of HDPE-v, the samples were ground and fed back into the extruder. As measured by tensile testing (FIG. 5C), HDPE-v maintained its integrity over the course of each reprocessing and preserved its mechanical properties. For comparison, unmodified HDPE was also tested and showed a slightly higher Young's modulus and yield point, but was found to have a similar elongation at break to HDPE-v. The decrease in Young's modulus for HDPE-v is attributed to a slight reduction in crystallinity, which was verified by DSC measurements where the unmodified HDPE was approximately 69% crystalline while HDPE-v was around 55% crystalline (FIGS. 9, 10). HDPE-v was molded into flat coupons and punched into disks for stress relaxation testing on a parallel plate rheometer (FIG. 5D). HDPE-v stress relaxation shows Arrhenius temperature dependence above the $T_m$ for HDPE and an apparent $E_a$ of 49 kJ/mol. DMTA temperature sweeps showed a plateau of the storage and loss modulus above the $T_m$, indicating the HDPE-v was indeed crosslinked, while the unmodified HDPE melted at ~150° C. and lost all mechanical integrity.

Figure 6A:
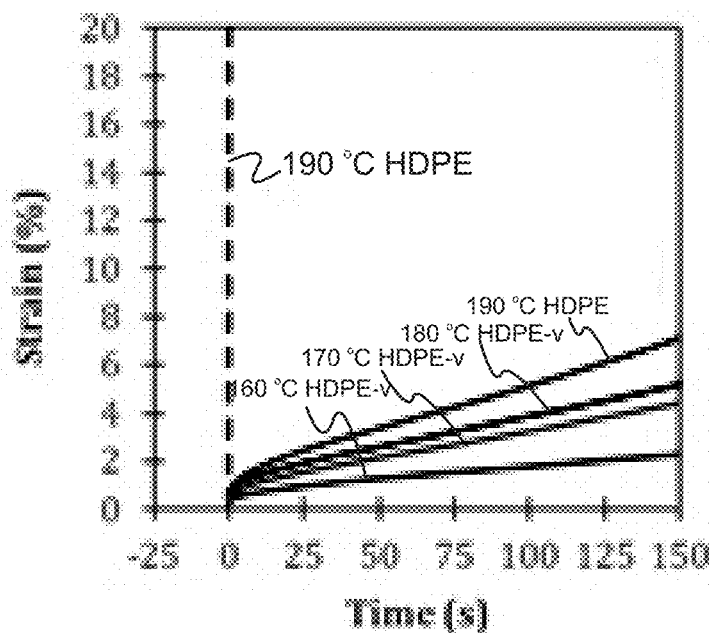
FIGS. 6A, 6B, 6C, 6D, 6E, and 6F. Creep and rheological testing of HDPE-v and PMMA-v. (A) Creep testing of HDPE and HDPE-v at various temperatures under 1 kPa force. (B) Creep resistance of PMMA-v as compared to PMMA under 10 kPa force. (C) Creep resistance of HDPE and HDPE-v under heavy force (10 MPa) at room temperature and the (D) statistical analysis. Frequency sweep of (E) HDPE and HDPE-v and (F) PMMA and PMMA-v from 0.01 to 100 Hz at 190° C. measuring G', G", and complex viscosity.
Figure 6B:
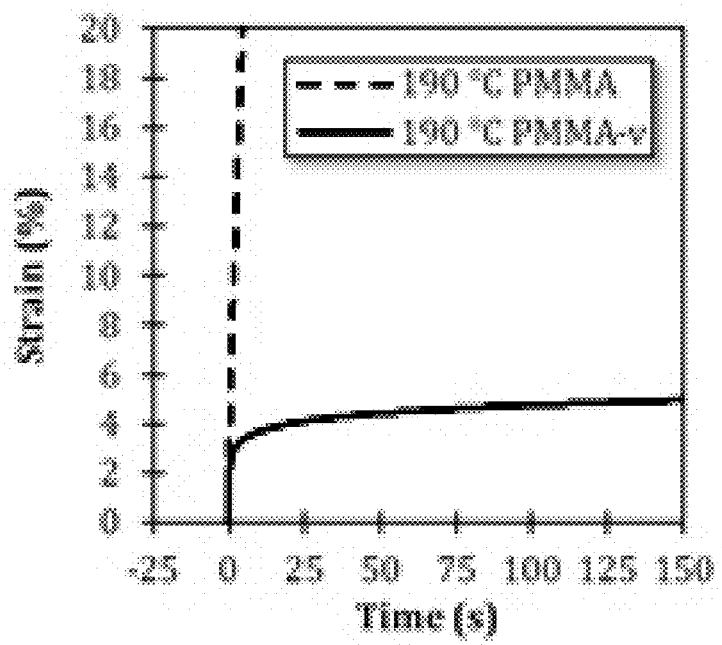
Figure 6C:
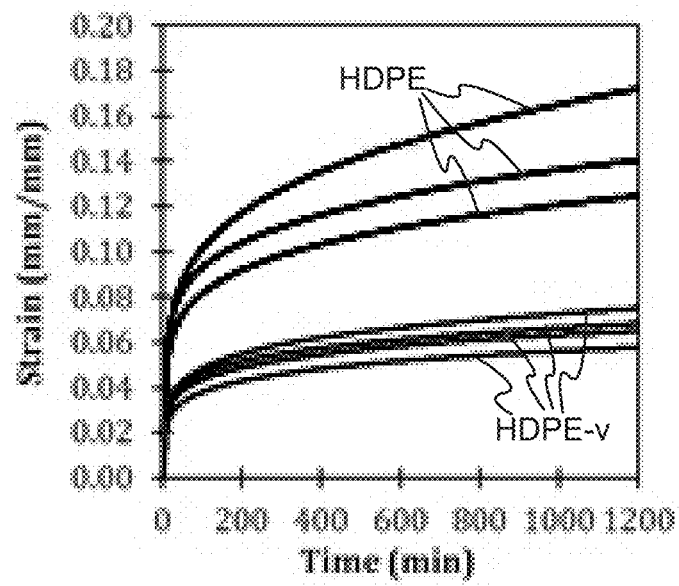
Figure 6D:
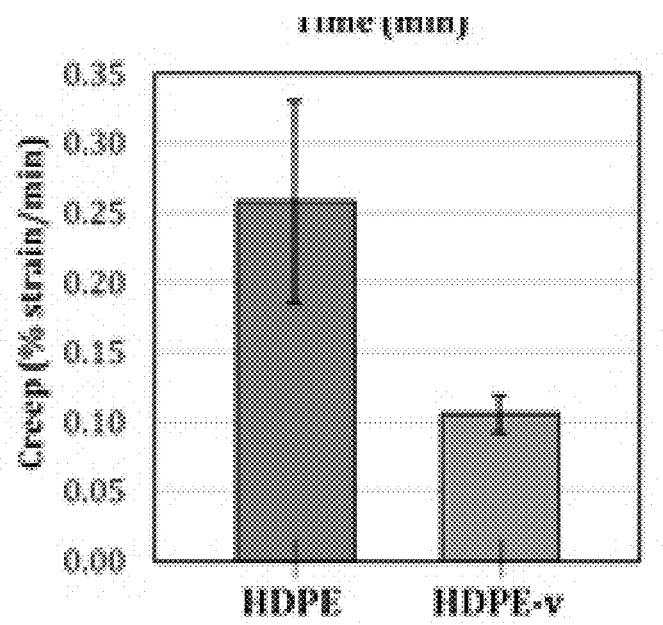

One of the major benefits of using vitrimer chemistry in traditional applications is their inherent resistance to creep. Linear polymers tend to creep above their $T_g$ in response to stress, while vitrimers prepared from analogous polymer backbones resist flow due to the embedded crosslinks. Owing to the associative exchange mechanism of the dynamic crosslinks, flow is restricted until two exchangeable motifs come into sufficient contact with each other. The exchange rate has a temperature dependence, thus making vitrimers a desired material for high-temperature applications. In FIG. 6A, the creep resistance of HDPE-v was compared to unmodified HDPE at temperatures above the $T_m$. Unmodified HDPE has a low melt viscosity and flows easily while HDPE-v strongly resists creep—even well above the $T_m$. Dramatic creep resistance was also observed for PMMA-v (FIG. 6B) at 190° C. More practically, we tested the creep resistance for HDPE and HDPE-v at room temperature under very large stresses of 10 MPa (FIG. 6C,D). HDPE-v had approximately 2.5× the creep resistance compared to HDPE and much less initial strain. The incorporation of crosslinks limited the initial extension under heavy load and limited the amount of creep in the amorphous phase.

Figure 6E:
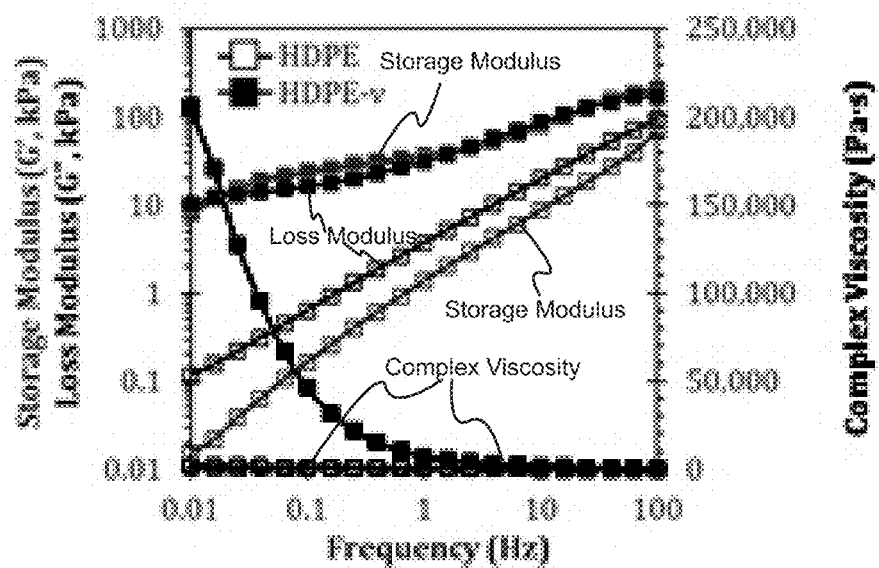
Figure 6F:
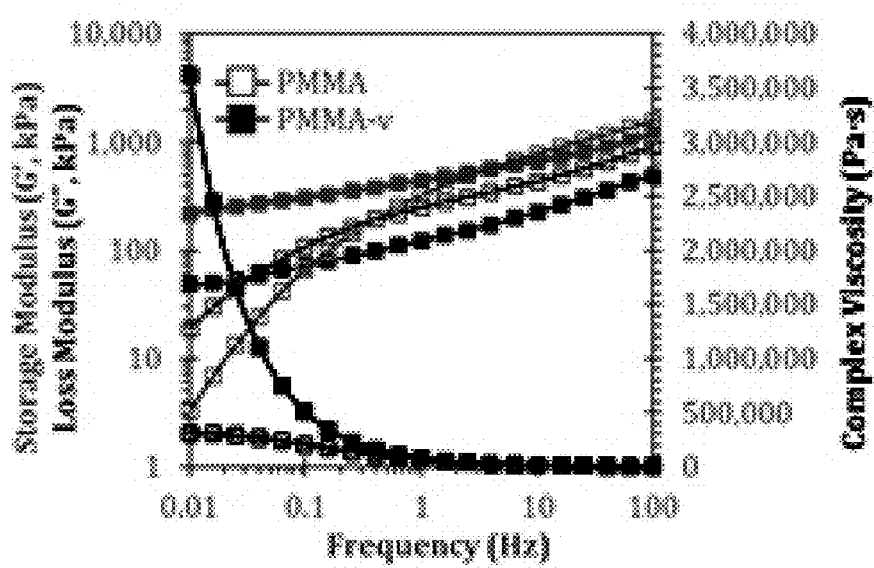

An interesting consideration on vitrimers prepared from reactive extrusion is the mechanism for the retention in network integrity during the high-shear environment. Under non-dynamic circumstances, highly crosslinked materials are sheared until they reach a sufficient domain size to pass through the internal gaps between the screws and barrel. In the case of dynamic materials however, there appears to be a dramatic shear-dependent viscosity decrease at frequencies above 1 Hz (FIG. 6E,F). Samples were punched into disks and heated to 190° C. in a parallel plate rheometer where the frequency was swept from 0.01-100 Hz. At low shear rates the viscosity of HDPE-v and PMMA-v were significantly higher than the analogous unmodified polymers. This large difference in viscosity is demonstrated by the vitrimers' creep resistance at high temperatures where the strain rate is low. However, a marked viscosity drop occurs as the shear rate increases above 1 Hz and the complex viscosity of the vitrimer begins to merge with that of the unmodified polymer. At low shear rates, polymer chains are crosslinked by the siloxane linkages as well as physically entanglement. At high shear rates, the rapid siloxane exchange allows for polymer chains to disentangle and align along the direction of shear, leading to less molecular interaction and a dramatic decrease in viscosity. Although these dynamic networks are densely crosslinked, they were easily processed on common polymer processing equipment at elevated temperature and shear. Shear thinning of vitrimers has been experimentally observed by other labs in the use of injection molding instruments to prepare samples for mechanical testing.[14] If static crosslinks were used instead of dynamic crosslinks, samples would not be processable in the same manner as evidenced from the $C_8$ diamine PMMA crosslinking. This behavior provides some insight into the preservation of crosslinks during the extrusion process.

CONCLUSION

In conclusion, we have discovered fluoride-catalyzed siloxane exchange as a new dynamic exchange motif. Siloxane linkages are highly stable to heat and oxidation while also being commercially relevant. Several catalysts were screened to promote the siloxane exchange and KF:DB18-c-6 was both stable over a wide temperature range and promoted the selective exchange of siloxane linkages. When incorporated into polymer networks such as PDMS, crosslinked HDPE, and crosslinked PMMA, fluoride-catalyzed siloxane exchange provided a robust method for preventing sample creep and maintaining network integrity at high processing conditions. Using rheology frequency sweeps, we elucidated the shear thinning behavior of PMMA and HPDE vitrimers to provide rationale for the retention of crosslinks through the reactive extrusion process. We envision that fluoride-catalyzed siloxane exchange chemistry can be used to broaden the adoption of vitrimer chemistry.

EXPERIMENTAL

General Experimental Information

Unless otherwise noted, reactions were carried out with dry solvents using a magnetic stir bar. Commercial reagents were used as received with no further purification, unless otherwise noted. $^1$H NMR spectra were recorded at 500 MHz on a Bruker DRX500 spectrometer. $^{13}$C NMR spectra were recorded at 125.2 MHz using a Bruker AVANCE600 with a BBFO cryoprobe. NMR spectra peaks are reported as δ values in ppm relative to TMS or residual solvent: $CDCl_3$ ($^1$H=7.26 ppm; $^{13}$C=77.0 ppm), $C_6D_6$ ($^1$H=7.16 ppm, $^{13}$C=128.06 ppm). $^1$H NMR data are reported as follows: chemical shift in ppm, multiplicity (s=singlet, d=doublet, t=triplet), coupling constants in Hz, and relative integration of the number of protons. Multiplets (m) are reported over the range of chemical shifts at which they appear. For $^{13}$C NMR, only chemical shift values are reported. Tensile tests were performed on an Instron 3365 mechanical tester. Differential Scanning calorimetry (DSC) thermograms were evaluated using a TA Instruments DSC2500. Thermogravimetric Analysis (TGA) thermograms were evaluated using a TA Instruments Q500. Dynamic Mechanical Thermal Analysis (DMTA) analysis was evaluated using a TA Instruments Q800. Rheology was evaluated using a TA Instruments DHR-2 Rheometer. Gas chromatography-mass spectrometry experiments (GC-MS) were taken using a Thermo Scientific ISQ GC Ultra. Extrusion was performed on a Thermo Haake Minilab II conical twin screw extruder with 7 $cm^3$ volume under nitrogen flow.

Synthesis and Vitrimer Preparation

Scheme 1. Preparation of KF:DB18-c-6.

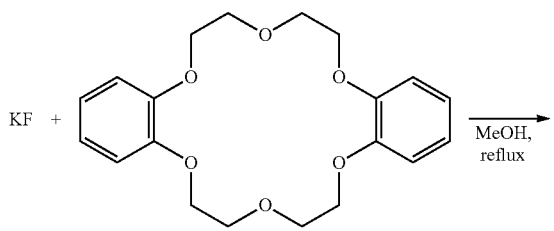

-continued

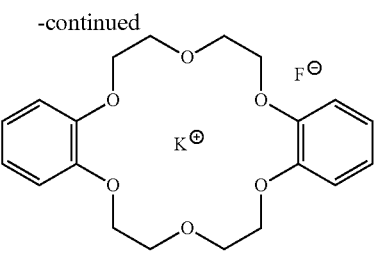

Potassium fluoride (1 equiv., 1.721 mmol, 100.0 mg) and dibenzo-18-crown-6 (1 equiv., 1.721 mmol, 620.3 mg) were added to 300 mL of methanol in a round bottom flask with a magnetic stir bar. The solution was brought to reflux for 1 hour and subsequently cooled to room temperature. The solvent was removed in vacuo to yield dry white flakes. The flakes were then ground to a fine powder using a mortar and pestle.

Scheme 2. Synthesis of dipentoxysilyl ether.

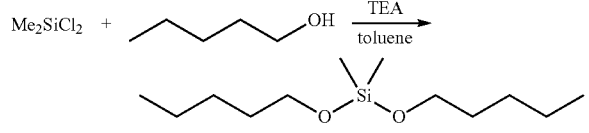

To a flame-dried and nitrogen-purged 3-necked flask fitted with a condenser and magnetic stir bar, anhydrous toluene (30 mL), anhydrous pentanol (3 equiv., 60 mmol, 6.498 mL), and anhydrous triethyl amine (3 equiv., 60 mmol, 8.362 mL) were added and the mixture lowered to 0° C. Dichlorodimethylsilane (1 equiv., 20 mmol, 2.412 mL) was added dropwise through a syringe. After 1 hour of stirring at 0° C., the reaction was slowly brought to reflux and held for 4 hours. The flask was then cooled to room temperature and the solvent was removed in vacuo. The slurry was dissolved in diethyl ether and filtered through a zeolite plug. The diethyl ether was removed, and the crude product was purified through fractional distillation at 78° C./0.50 mmHg. Yield: 3.2368 g (70%).

Dipentoxysilyl ether. $^1$H NMR (500 MHz, CDCl$_3$, 298 K) δ 3.66 (t, J=6.6 Hz, 4H), 1.63-1.48 (m, 411), 1.36-1.26 (m, 8H), 0.90 (t, J=6.3 Hz, 6H), 0.11 (s, 6H). $^{13}$C NMR (125 MHz, CDCl$_3$, 298 K) δ 62.62, 32.36, 28.05, 22.54, 14.10, 3.15.

Scheme 3.
Synthesis of dihexyltetramethyldisiloxane &
dinonyltetramethyldisiloxane

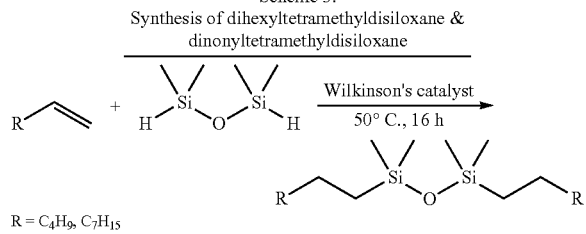

R = C$_4$H$_9$, C$_7$H$_{15}$

Into a round bottom flask with a magnetic stir bar, Wilkinson's catalyst (0.0005 equiv., 12.7 µmol, 11.7 mg), alkene (2.5 equiv., 63.37 mmol), and 1,1,3,3-tetramethyldisiloxane (1 equiv., 23.35 mmol, 3.405 g) were added without solvent. The mixture was heated to 50° C. overnight followed by purification by fractional distillation (125° C./0.350 mmHg for R=C$_4$H$_9$ and 166° C./0.168 mmHg for R=C$_7$H$_{15}$) twice to yield a colorless oil.

R=C$_4$H$_9$: 4.3166 g (37.5% yield)
R=C$_7$H$_{15}$: 7.5082 g (76.6% yield)

Dihexyltetramethyldisiloxane. $^1$H NMR (500 MHz, CDCl$_3$, 298 K) δ 1.35-1.2 (m, 16H), 0.89 (t, J=6.3 Hz, 6H), 0.50 (t, J=5.4 Hz, 4H), 0.03 (s, 12H). $^{13}$C NMR (125 MHz, CDCl$_3$, 298 K) δ 33.17, 31.70, 23.30, 22.66, 18.48, 14.19, 0.42.

Dinonyltetramethyldisiloxane. $^1$H NMR (500 MHz, CDCl$_3$, 298 K) δ 1.35-1.20 (m, 28H), 0.88 (t, J=6.9 Hz, 6H), 0.50 (t, J=7.2 Hz, 4H), 0.03 (s, 12H). $^{13}$C NMR (125 MHz, CDCl$_3$, 298 K) δ 33.50, 31.98, 29.63, 29.47, 29.45, 23.34, 22.74, 18.47, 14.16, 0.43.

Scheme 4. Synthesis of bismaleimidotetramethyldisiloxane.

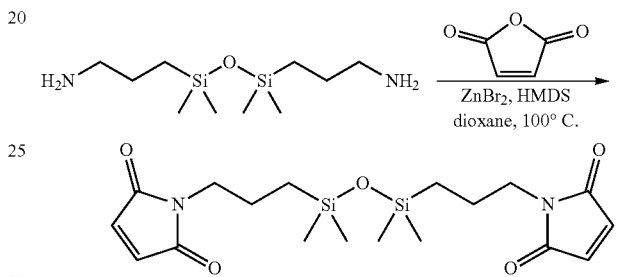

Maleic anhydride (2 equiv., 32.19 mmol, 3.157 g) was added to a dried 3-necked round bottom flask and dissolved with 30 mL dry dichloromethane followed by the dropwise addition of 1,3-bis(aminopropyl)tetramethyldisiloxane (1 equiv., 16.10 mmol, 4.000 g). After 1 hour of stirring at room temperature, the solvent was removed in vacuo and the brown oil was re-dissolved in 1,4-dioxane (30 mL). To the solution, zinc bromide (2 equiv., 32.19 mmol, 7.249 g) and hexamethyldisilazane (3 equiv., 48.29 mmol, 7.778 g) were added and the slurry was brought to 100° C. After 30 minutes, the mixture was brought back to room temperature and the solvent was removed in vacuo. The crude powder was purified though solid loading flash chromatography (Teledyne Isco® CombiFlash+) with 30:70 ethyl acetate to hexanes. Yield: 1.9567 g (30%).

Bismaleimidotetramethyldisiloxane: $^1$H NMR (500 MHz, CDCl$_3$, 298 K) δ 6.68 (s, 4H), 3.48 (t, J=7.3 Hz, 4H), 1.62-1.50f (m, 4H), 0.53-0.38 (m, 4H), 0.03 (s, 12H). $^{13}$C NMR (125 MHz, CDCl$_3$, 298 K) δ 170.96, 134.06, 40.77, 22.60, 15.36, 0.27.

Procedure for Model Compound Hydrolysis Study.

The model compound of interest (dipentoxysilyl ether or dihexyltetramethyldisiloxane, 0.50 mmol) was added to a one-dram vial with a magnetic stir bar and dissolved with 0.350 mL N-methyl-2-pyrrolidone and 0.005 mL of 1 M HCl. The vial was capped and heated to 90° C. and aliquots were taken at different time intervals for analysis via GC-MS. The disappearance of starting material was used to calculate percent conversion.

Representative Procedure for Siloxane Exchange Model Compound Study

First, a stock solution of the required catalyst was prepared by dissolving the catalyst (77.4 µmol) in 1,2,4-trichlorobenzene to bring the total volume to 4.00 mL. For the exchange study, dihexyltetramethyldisiloxane (43.9 mg, 145.1 µmol) and dinonyltetramethyldisiloxane (56.1 mg, 145.1 µmol) were added to a one-dram vial and dissolved with the stock catalyst solution (300 µL, 5.8 µmol catalyst) to yield a 2 mol % catalyst solution. The vial was capped and heated in an oil bath to the required temperature. Aliquots were taken at various time points and analyzed through GC-MS.

Figure 7:
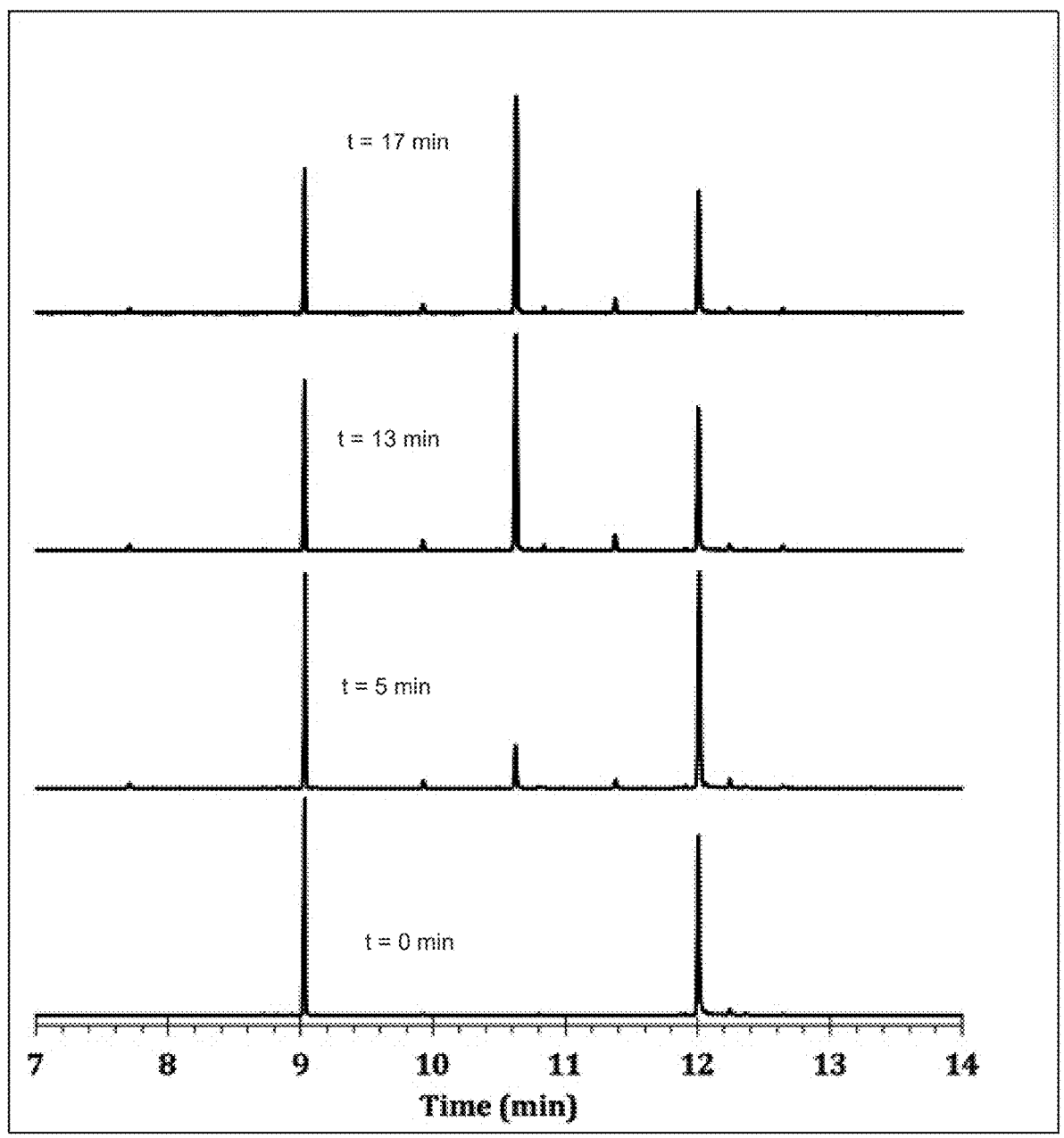
FIG. 7. Representative GC-MS chromatogram of the exchange between dihexyltetramethyldisiloxane (RT: 9.017 min) and dinonyltetramethyldisiloxane (RT: 11.997 min) in the presence of 2 mol % KF:DB18-c-6 at 140° C. to yield the mixed product (RT:10.612 min). The small peaks at RT 9.926 min, 11.375 min, and 12.646 min are 1,5-bisdihexylhexamethyltrisiloxane, 1,5-bishexylnonylhexamethyltrisiloxane, and 1,5-bisnonylhexamethyltrisiloxane, respectively. The small peak at 12.242 min is an isomer of 1,5-dinonyltetramethyldisiloxane that could not be removed with distillation.

FIG. 7 provides representative GC-MS chromatograms of the exchange between dihexyltetramethyldisiloxane (RT: 9.017 min) and dinonyltetramethyldisiloxane (RT: 11.997 min) in the presence of 2 mol % KF:DB18-c-6 at 140° C. to yield the mixed product (RT:10.612 min). The small peaks at RT 9.926 min, 11.375 min, and 12.646 min are 1,5-bisdihexylhexamethyltrisiloxane, 1,5-bishexylnonylhexamethyltrisiloxane, and 1,5-bisnonylhexamethyltrisiloxane, respectively. The small peak at 12.242 min is an isomer of 1,5-dinonyltetramethyldisiloxane that could not be removed with distillation.

Determining the Energy of Activation from Small Molecule Kinetics.

The chemical equation to represent the model siloxane exchange is $$2AA + 2BB \rightarrow AA^* + 2AB^* + BB^*$$

wherein:

AA=dihexyltetramethyldisiloxane

AB=1-hexyl-3-nonyltetramethyldisiloxane

BB=dinonyltetramethyldisiloxane

By using the initial time points at 100° C. (373 K), AB* had reached 8.22% conversion in 5 (300 s) minutes, therefore:

$$t_{0\ min} = 0.362 M_{AA} + 0.362 M_{BB} \rightarrow 0 M_{AA^*} + 0 M_{AB^*} + 0 M_{BB^*}$$

$$t_{5\ min} = 0.332 M_{AA} + 0.332 M_{BB} \rightarrow 0.015 M_{AA^*} + 0.030 M_{AB^*} + 0.015 M_{BB^*}$$

Using the Rate Equation:

$$\text{rate} = -\frac{d[AA]}{dt} = k[AA][BB] \quad (1)$$

$$k_1 = 8.986 \times 10^{-4} s^{-1} M^{-1}$$

By using the initial time points at 120° C. (393 K), AB* had reached 13.76% conversion in 5 minutes (300 s), therefore:

$$t_{0\ min} = 0.362 M_{AA} + 0.362 M_{BB} \rightarrow 0 M_{AA^*} + 0 M_{AB^*} + 0 M_{BB^*},$$

$$t_{5\ min} = 0.312 M_{AA} + 0.312 M_{BB} \rightarrow 0.025 M_{AA^*} + 0.050 M_{AB^*} + 0.025 M_{BB^*}$$

By using equation 1: $k_2 = 1.704 \times 10^{-3}\ s^{-1} M^{-1}$

Inputting the above values into the Arrhenius equation:

$$\ln\left(\frac{k_1}{k_2}\right) = \left(\frac{1}{T_2} - \frac{1}{T_1}\right)\frac{E_a}{R} \quad (2)$$

Yields an $E_a$ of 38.98 kJ/mol.

Preparation of the PDMS Elastomer with Embedded Catalyst

Scheme 5. Synthesis of PDMS elastomer with embedded catalyst.

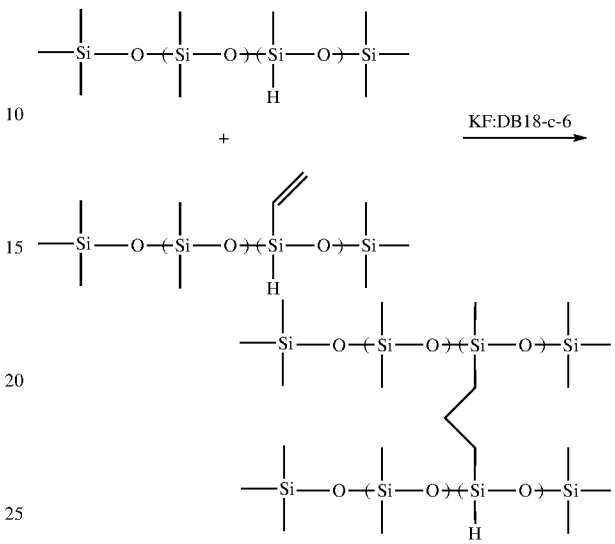

The commercially available Dow® Sylgard 184 2-part elastomer kit was used to prepare the PDMS samples. The PDMS base (5.0228 g) was added to a 6 dram vial followed by the addition of 250 mg KF:DB18-c-6 fluoride catalyst. The base and catalyst were vigorously mixed with a mechanical stirrer and gentle heating to disperse the catalyst throughout the base. The curing agent (0.5020 g) was then vigorously mixed into the base and catalyst without heat. The mixture was poured into flat-bottom culture dishes and bubbles were removed at room temperature under low vacuum (260 mmHg) for 30 minutes followed by high vacuum (0.3 mmHg) for 30 minutes. A PDMS elastomer without catalyst was prepared in the same manner. After curing at room temperature for 3 days, the elastomer was punched into 20 mm disks for use on a parallel plate rheometer. Stress relaxation measurements were taken at 1% strain, which was within the linear response range.

PMMA-v Preparation

Poly(methyl methacrylate) (Acros Organics, $M_n$=35,000) beads of approximately 0.5 mm were dried under heat and vacuum at 60° C. and 0.3 mmHg for two hours prior to use. The PMMA beads (5.000 g), 1,3-bisaminopropyltetramethyldisiloxane (4 wt %, 200 mg), and KF:DB18-c-6 (5 mol %, 16.8 mg) were added to a Nalgene tube and vigorously mixed for five minutes. The mixture was fed into an extruder and melt blended at 230° C. and 60 RPM for 10 minutes under nitrogen. After flushing the extrudate through the strand die, the strands were compression molded at 180° C. for physical testing.

HDPE-v Preparation

HDPE pellets with MFI=2.2 g/10 minutes (190° C./2.16 kg) were milled into a fine powder using a Fritsch Pulverisette rotary mill fitted with a 0.5 mm sieve cassette and dried at under heat and vacuum at 60° C. and 0.3 mmHg for two hours prior to use. HDPE powder (5.000 g), bismaleimidotetramethyldisiloxane (4 wt %, 200 mg), powdered dicumyl peroxide (0.25 wt %, 12.5 mg), and KF:DB18-c-6 (10 mol % fluoride, 20.5 mg blend) were added to a Nalgene tube and vigorously mixed for five minutes. The blend was fed into the extruder at 190° C. and 60 RPM for 5 minutes under a blanket of nitrogen. After flushing the extrudate, the strands were compression molded at 180° C. for physical testing. For recycling demonstrations, the HDPE-v was cut into ~4 mm pieces, coated with a small amount of BHT antioxidant (2000 ppm) and fed back into the extruder at 190° C. running at 60 RPM.

Physical Characterization and Testing

Insoluble Content Testing

Approximately 75 mg portions of crosslinked material were swollen in 20 mL of dried solvents (PMMA-v=22° C. chloroform and HDPE-v=120° C. xylenes) for 24 hours. The swollen gel was then physically removed and dried under high vacuum until the weight became constant. The gel fraction is based on the weight after swelling and drying divided by the weight before swelling.

TABLE 2

Gel content of HDPE-v over three reprocessing cycles.

|  |  | Piece 1 | Piece 2 | Piece 3 | Average |
|---|---|---|---|---|---|
| Round 1 | Before | 52.1 mg | 64.5 mg | 75.0 mg |  |
|  | After | 26.3 mg | 33.1 mg | 34.3 mg |  |
|  | Gel % | 50.5% | 51.3% | 45.7% | 49.2% ± 3.0% |
| Round 2 | Before | 62.7 mg | 77.1 mg | 74.5 mg |  |
|  | After | 32.6 mg | 35.1 mg | 34.0 mg |  |
|  | Gel % | 52.0% | 47.1% | 45.6% | 48.2% ± 3.3% |
| Round 3 | Before | 76.6 mg | 73.4 mg | 72.4 mg |  |
|  | After | 36.3 mg | 34.5 mg | 33.7 mg |  |
|  | Gel % | 47.4% | 47.0% | 46.5% | 47.0% ± 3.3% |

TABLE 3

Gel content of PMMA-v at different catalyst loading concentrations.

| Catalyst Loading |  | Piece 1 | Piece 2 | Piece 3 | Average |
|---|---|---|---|---|---|
| 10 mol % | Before | 120.9 mg | 106.8 mg | 95.0 mg |  |
|  | After | 104.3 mg | 89.4 mg | 79.5 mg |  |
|  | Gel % | 86.2% | 83.7% | 83.7% | 84.5% ± 1.4% |
| 5 mol % | Before | 160 mg | 132.4 mg | 83.7 mg |  |
|  | After | 119.6 mg | 99.0 mg | 65.4 mg |  |
|  | Gel % | 74.8% | 74.8% | 78.1% | 75.9% ± 1.9% |
| 1.25 mol % | Before | 85.7 mg | 222.6 mg | 60.3 mg |  |
|  | After | 66.2 mg | 173.7 mg | 46.6 mg |  |
|  | Gel % | 77.2% | 78.0% | 77.3% | 77.5% ± 0.4% |

TBAF Dissolution

Approximately 75 mg portions of crosslinked network were swollen in 20 mL of good solvents (PMMA-v=chloroform, HDPE-v=120° C. xylenes) for 24 hours. Approximately 10 mg of tetrabutylammonium fluoride hydrate was added in three portions over the course of 3 hours due to the rapid degradation of TBAF in hot solvent. After the final addition of excess fluoride, the samples had totally dissolved, and no gel remained.

Creep Tests

At room temperature, creep tests were performed on a Instron 3365 mechanical tester fitted with pneumatic grips. Dog bone shaped samples (1.5 mm×3.5 mm×15 mm) were exerted to 10 MPa force for 20 minutes. The average creep rate was taken from 100-1200 seconds to remove the initial elastic response of the sample. At elevated temperatures, creep testing was performed on a TA Instruments DHR-2 rheometer equipped with a 12 mm parallel plate. A constant normal force of 10 Newtons was applied for vitrimer samples to maintain good contact.

Stress Relaxation

For HDPE-v, stress relaxation experiments were performed on a TA Instruments DHR-2 rheometer equipped with a 12 mm parallel plate. HDPE-v samples were first compression molded into coupons and then punched into 12 mm disks for testing. A strain of 3% was applied using a strain rise time of 0.1 seconds. For PMMA-v, stress relaxation was performed on a TA Instruments DMA Q800 in film mode using 1% strain. A constant normal force of 10 Newtons was applied for vitrimer samples to maintain good contact.

Dynamic Mechanical Thermal Analysis (DMTA)

DMTA temperature sweeps of PMMA, PMMA-v, HDPE, and HDPE-v were characterized on a TA Instruments DMA Q800 in film mode. The oscillation frequency was set to 3 Hz, the oscillatory strain to 0.1%, and the temperature ramp was set to 3° C./min.

Figure 8A:
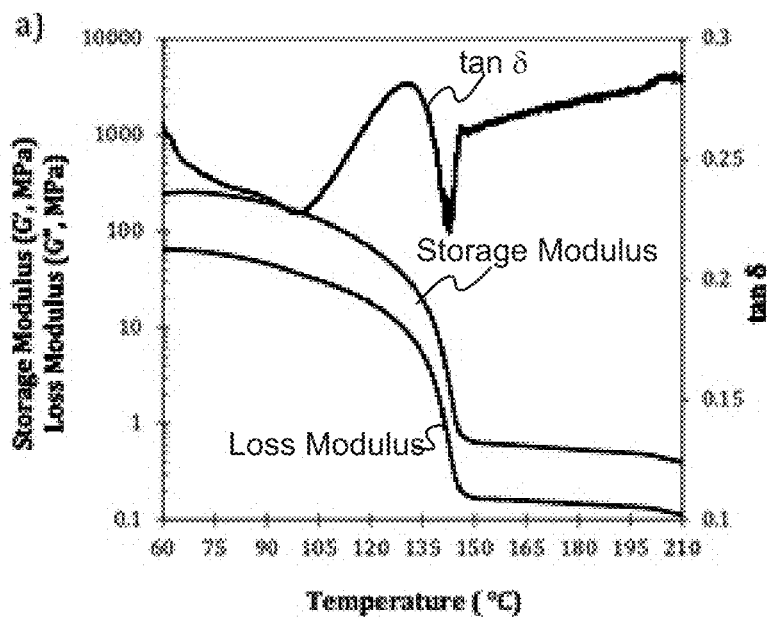
FIG. 8. DMTA temperature sweeps (a) HDPE-v and (b) PMMA-v.
Figure 8B:
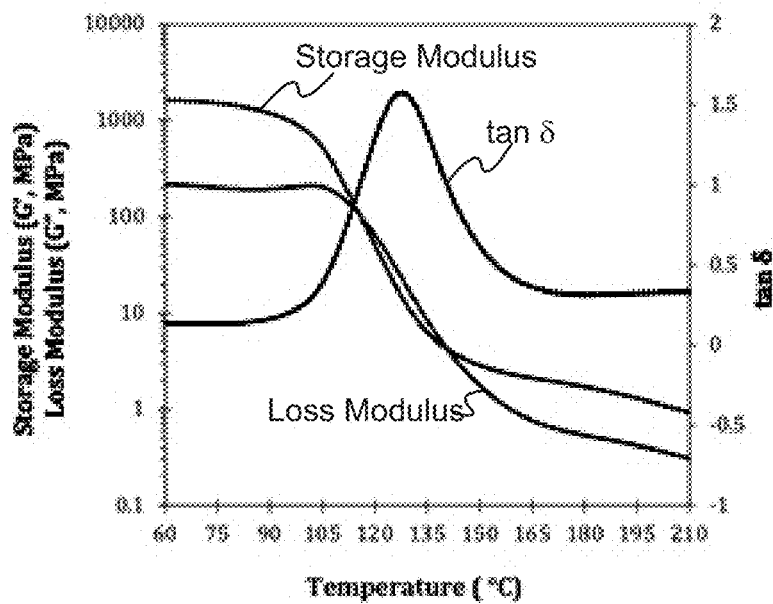

FIGS. 8A and 8B provide DMTA temperature sweeps HDPE-v and PMMA-v, respectively.

Frequency Sweeps

Frequency sweeps were performed on a TA Instruments DHR-2 rheometer equipped with a 12 mm parallel plate. The oscillatory strain was set to 0.5% and the frequency was swept from 0.01-100 Hz at 190° C.

DSC Measurements

DSC measurements were performed on a TA Instruments DSC2500 under an inert nitrogen atmosphere. Approximately 10 mg of sample was sealed in a hermetic pan and subjected to a heat-cool-heat cycle where the sample was heated at 20° C./min and cooled at 10° C./min from −90° C. to 200° C. FIG. 9 provides DSC thermogram of unmodified HDPE while FIG. 10 provides a DSC thermogram of HDPE-v after three reprocessing cycles.

Unmodified HDPE: Enthalpy of $2^{nd}$ melting heat: 200.95 J/g=68.6% crystalline.

HDPE-v: Enthalpy of $2^{nd}$ melting heat: 159.89 J/g=54.6% crystalline.

TGA Measurements

Figure 11:
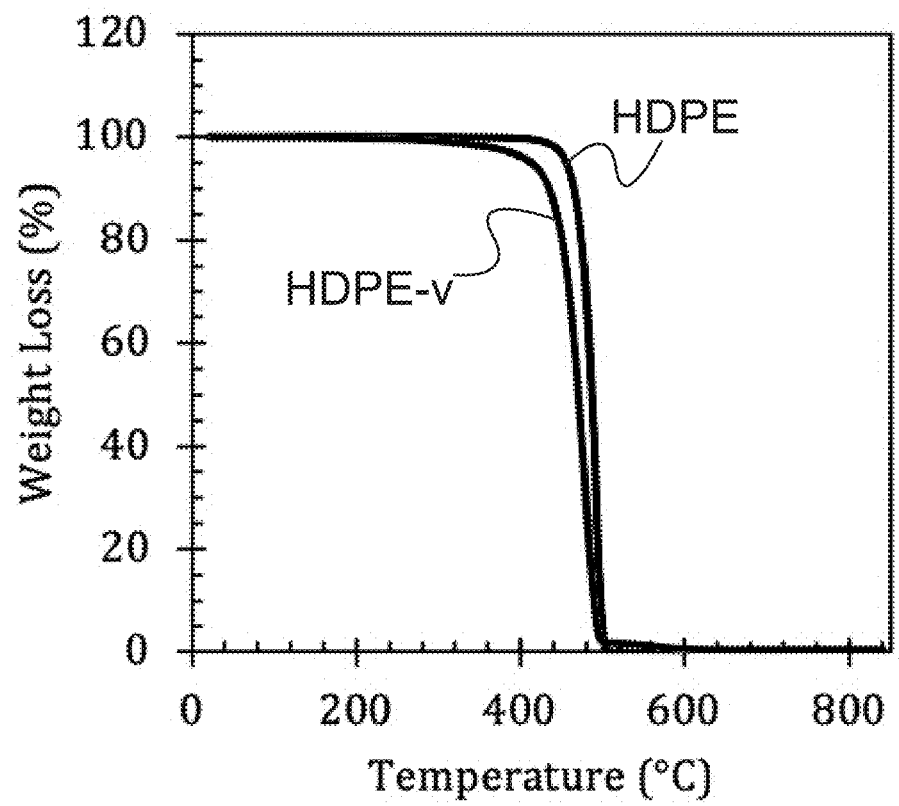
FIG. 11. TGA thermogram of unmodified HDPE and HDPE-v.
Figure 12A:
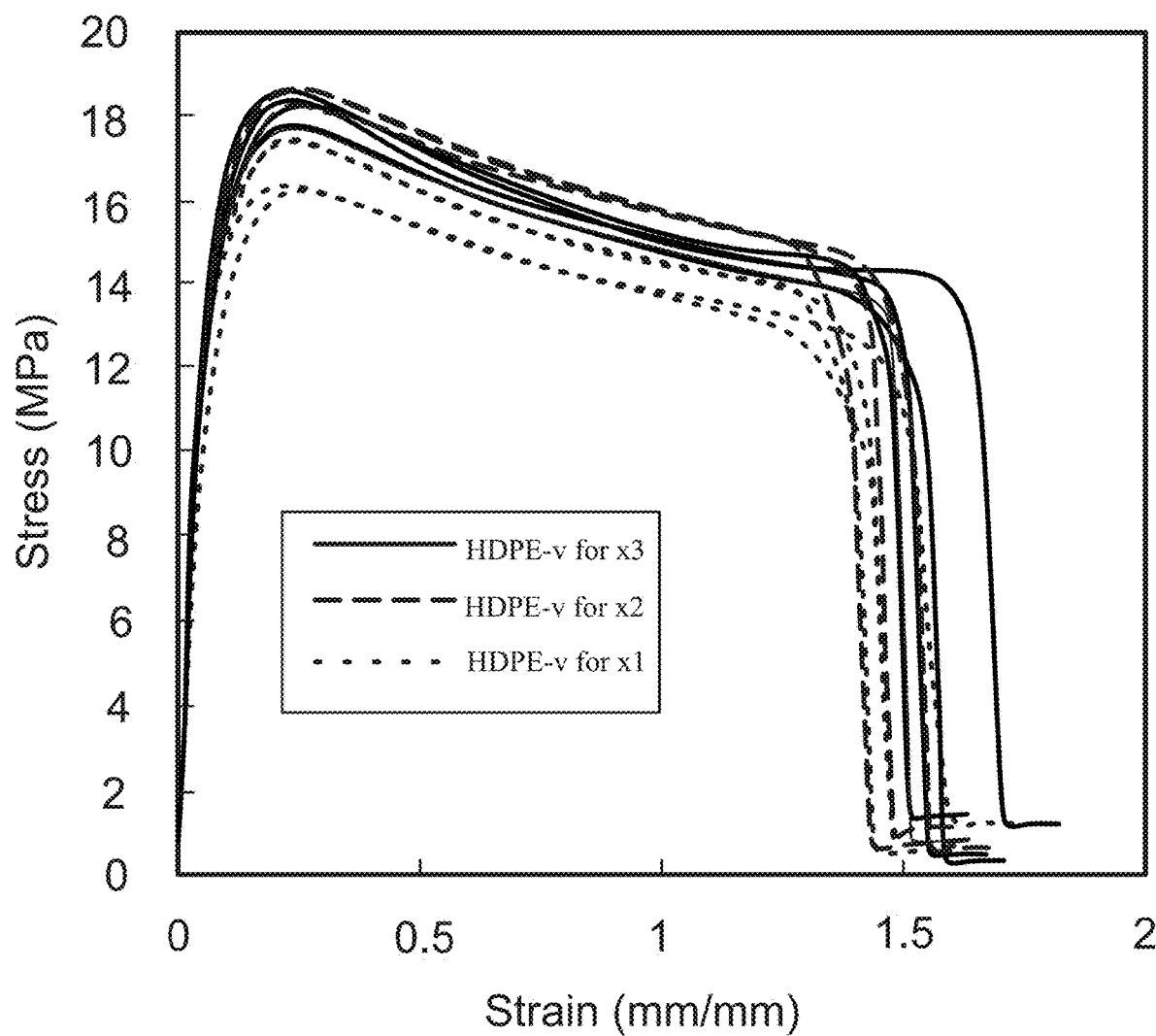
FIG. 12. Tensile testing of HDPE-v for ×1 (red), ×2 (blue), and ×3 (black) reprocessing in triplicates.
Figures 1, 12B:
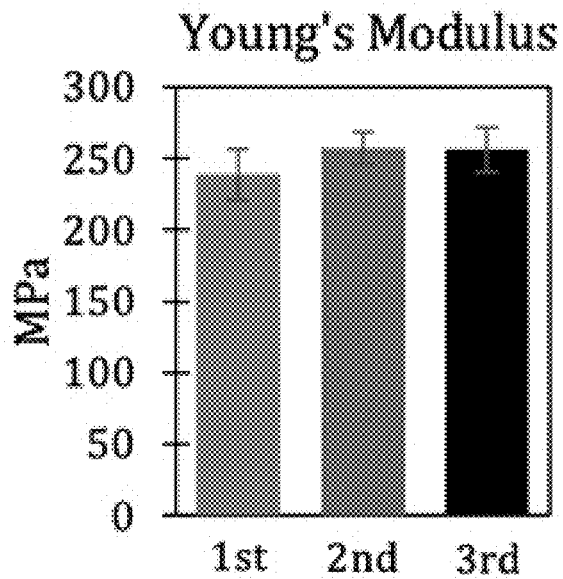
Figures 2, 12B:
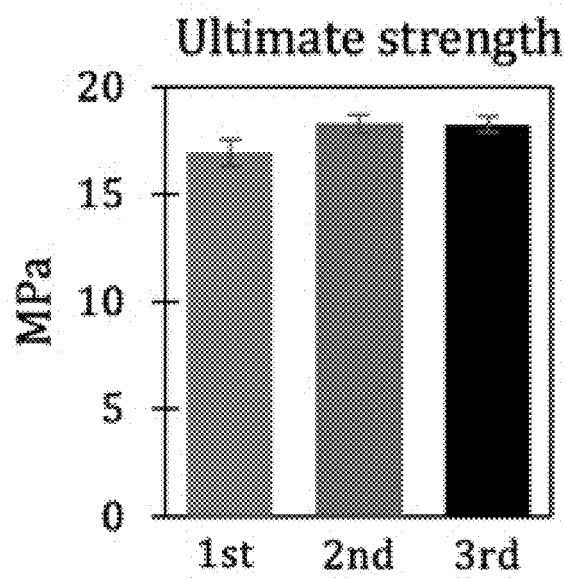
Figures 3, 12B:
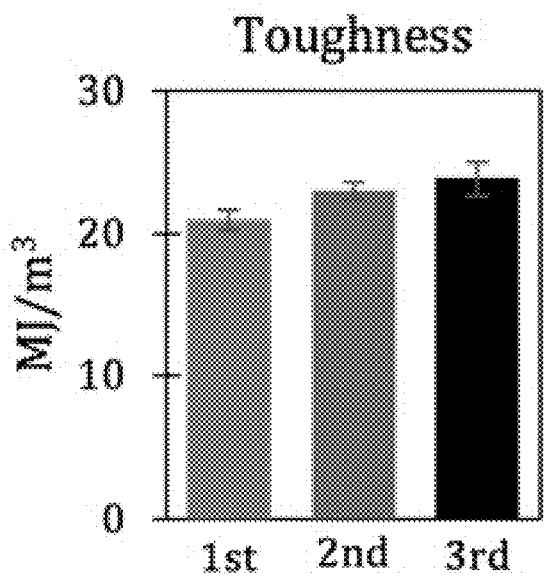
Figures 4, 12B:
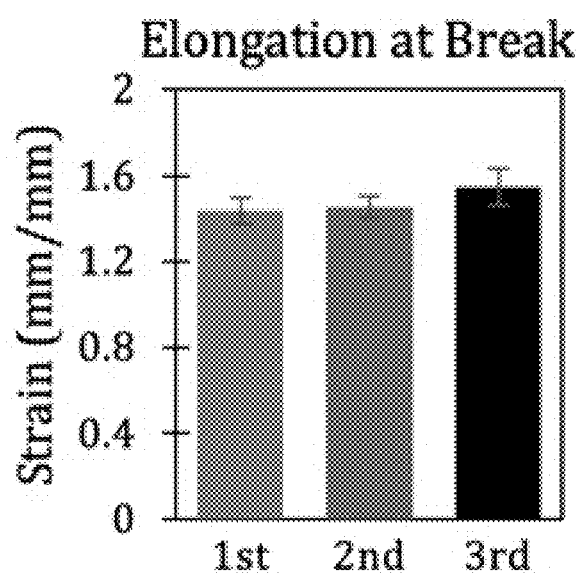

TGA measurements were performed on a TA Instruments Q500 under nitrogen atmosphere. Approximately 15 mg of sample was placed on a platinum crucible and heated at a rate of 20° C./min from ambient temperature to 850° C. FIG. 11 provides TGA thermograms of unmodified HDPE and HDPE-v.

Unmodified HDPE: 5% weight loss at 456° C.

HDPE-v: 5% weight loss at 414° C.

Tensile Testing

Tensile testing was performed on a Instron 3365 mechanical tester fitted with pneumatic grips. Samples were compression molded into dog bone shapes (1.5 mm×3.5 mm×15 mm) and exerted to a strain rate of 1 mm/mm/min (100% of the initial measured length per minute). FIG. 12 provides tensile testing of HDPE-v for ×1 (red), ×2 (blue), and ×3 (black) reprocessing in triplicates.

Determination of the Topology Freezing Temperature ($T_v$)

The topology freezing temperature was determined as previously reported.[1]

Using the Maxwell Equation for Viscosity $$\eta = G \cdot \tau^* = \frac{E'}{2(1+v)} \cdot \tau^* \quad (1)$$

and inputting the Poisson's ratio (v) for HDPE (0.46),[2] Equation S1 is simplified to:

$$\eta = 0.342 \times E' \times \tau^* \quad (2)$$

From DMTA measurements, the storage modulus E' is approximately 0.60 MPa at 160° C. The viscosity at the topology freezing temperature is approximated to $\eta = 10^{12}$ Pa, therefore $\tau^* = 4,863,518$ s. By inserting $\tau^*$ into the equation for the line of best fit from the stress relaxation Arrhenius treatment of HDPE-v:

$$\ln\tau^*(T) = 5.888 \times \frac{1000}{T} - 14.573 \quad (3)$$

we can extrapolate to the temperature at which the siloxane exchange has been arrested. It was found that the $T_v$ for HDPE-v is 196 K (−76° C.).

Scheme 6. Synthesis of bismaleimidotetramethyldisiloxane.

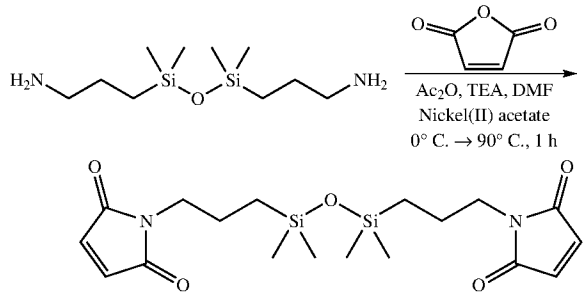

To a 20 mL scintillation vial containing a stir bar was added 3.2 mL of dimethylformamide and maleic anhydride (2 equiv., 8.26 mmol, 0.810 g). The solution cooled to −78° C. before a tared syringe was used to transfer 1,3-bis(aminopropyl)tetramethyldisiloxane (1 equiv., 3.92 mmol, 0.975 g) drop-wise. The reaction mixture was allowed to warm to r.t. before further heating to 90° C. for 30 minutes. Then, acetic anhydride (4 equiv., 16 mmol, 1.6 g), nickel(II) acetate (0.02 equiv., 0.1 mmol, 0.018 g), and triethyl amine (0.4 equiv., 1.6 mmol, 0.16 g) was added to the flask and the mixture was allowed to stir under heat for an additional 30 minutes. Next, the reaction mixture was poured over a slurry of ice (~100 mL volume in a beaker) and stirred for one hour. The aqueous solution was decanted extracted thrice with 30 mL EtOAc, while the crude oil was dissolved in 50 mL EtOAc and extracted thrice with 70 mL of brine. The organic layers were combined, dried over sodium sulfate, and concentrated in vacuo. The crude oil was purified though solid loading flash chromatography (Teledyne Isco® Combi-Flash+) with 30:70 ethyl acetate to hexanes.

Yield: 0.7970 g (50%).

Bismaleimidotetramethyldisiloxane: $^1$H NMR (500 MHz, CDCl$_3$, 298 K) δ 6.68 (s, 4H), 3.48 (t, J=7.3 Hz, 4H), 1.62-1.50f (m, 4H), 0.53-0.38 (m, 4H), 0.03 (s, 12H). $^{13}$C NMR (125 MHz, CDCl$_3$, 298 K) δ 170.96, 134.06, 40.77, 22.60, 15.36, 0.27.

Scheme 7. Synthesis of butyl 3-(furan-2-yl)acrylate.

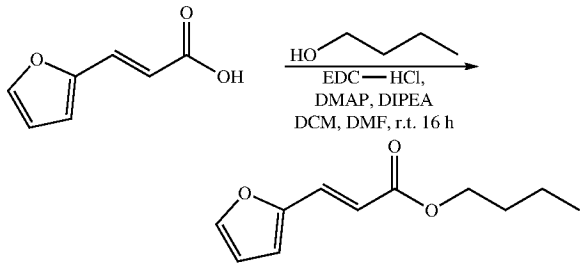

To a flame-dried 50 mL round-bottomed flask was added 20 mL of dry dichloromethane with 5 mL of dimethylformamide, along with a stir bar. To the flask was added furfurylideneacetic acid (1.1 equiv., 14.86 mmol, 2.053 g), EDC-HCl (1.8 equiv., 24.35 mmol, 4.667 g), DIPEA (2.7 equiv., 24.29 mmol, 3.139 g), and DMAP (0.3 equiv., 4.10 mmol, 0.501 g) to the flask. The mixture was allowed to stir for five minutes before n-butanol (1 equiv., 13.49 mmol, 1.000 g) was added via a tared syringe. The mixture was allowed to stir at room temperature overnight. The reaction mixture was then transferred to a 250 mL separatory funnel and diluted with 20 mL of dichloromethane. The organic layer was extracted thrice with 50 mL of saturated brine solution before being dried over sodium sulfate and concentrated in vacuo. The crude oil was purified though solid loading flash chromatography (Teledyne Isco® Combi-Flash+) with 10:90 ethyl acetate to hexanes to yield the product in good agreement with previous reports.[1]

Yield: 2.2390 g (85%).

Butyl 3-(furan-2-yl)acrylate: $^1$H NMR (500 MHz, CDCl$_3$) δ 7.50-7.45 (m, 1H), 7.42 (d, J=15.7 Hz, 1H), 6.60 (d, J=3.4 Hz, 1H), 6.46 (dd, J=3.4, 1.8 Hz, 1H), 6.32 (dt, J=15.7, 0.4 Hz, 1H), 4.19 (t, J=6.7 Hz, 2H), 1.71-1.63 (m, 2H), 1.48-1.37 (m, J=14.7, 8.4, 6.6 Hz, 2H), 0.95 (t, J=7.4 Hz, 3H).

LDPE-v Preparation

Low-density polyethylene (LDPE) pellets with MFI=1.5 g/10 minutes (190° C./2.16 kg) were milled into a fine powder using a Fritsch Pulverisette rotary mill fitted with a 2 mm sieve cassette and dried at under heat and vacuum at 60° C. and 0.3 mmHg for two hours prior to use. LDPE powder (5.000 g), bismaleimidotetramethyldisiloxane (4 wt %, 200 mg), powdered dicumyl peroxide (0.25 wt %, 12.5 mg), and KF:DB18-c-6 (10 mol % fluoride, 20.5 mg blend) were added to a Nalgene tube and vigorously mixed for five minutes. The blend was fed into the extruder at 190° C. and 60 RPM for 5 minutes under a blanket of nitrogen. After flushing the extrudate, the strands were compression molded at 150° C. for physical testing.

iPP-v Preparation

Isotactic polypropylene (iPP) pellets (Sigma Aldrich, $M_n$=97,000 g/mol) were milled into a fine powder using a Fritsch Pulverisette rotary mill fitted with a 2 mm sieve cassette and dried at under heat and vacuum at 60° C. and 0.3 mmHg for two hours prior to use. iPP powder (4.500 g), bismaleimidotetramethyldisiloxane (0.3 mol %, 131 mg), butyl 3-(furan-2-yl)acrylate (0.6 mol %, 0.125 mg), Luperox® 101 (0.3 mol %, 93 mg), and KF:DB18-c-6 (10 mol % fluoride, 13 mg blend) were added to a Nalgene tube and vigorously mixed for five minutes. The blend was fed into the extruder at 200° C. and 60 RPM for 5 minutes under a blanket of nitrogen. After flushing the extrudate, the strands were compression molded at 190° C. for physical testing.

Physical Characterization and Testing

Insoluble Content Testing

Approximately 75 mg portions of either LDPE-v or iPP-v were swollen in 15 mL of dried mesitylene at 155° C. for 24 hours. The swollen gel was then physically removed and dried under high vacuum until the weight became constant. The gel fraction is based on the weight after swelling and drying divided by the weight before swelling.

TABLE 4

Gel content of iPP-v.

|  | Piece 1 | Piece 2 | Piece 3 | Average |
|---|---|---|---|---|
| Before | 20.7 mg | 54.6 mg | 51.0 mg |  |
| After | 8.3 mg | 24.9 mg | 19.7 mg |  |
| Gel % | 40.1% | 45.6% | 38.6% | 41.4% ± 3.7% |

TABLE 5

Gel content of LDPE-v.

|  | Piece 1 | Piece 2 | Piece 3 | Average |
|---|---|---|---|---|
| Before | 50.8 mg | 54.4 mg | 46.5 mg |  |
| After | 22.8 mg | 23.6 mg | 21.7 mg |  |
| Gel % | 44.9% | 45.6% | 46.7% | 45.7% ± 0.9% |

Creep Tests

Figure 13:
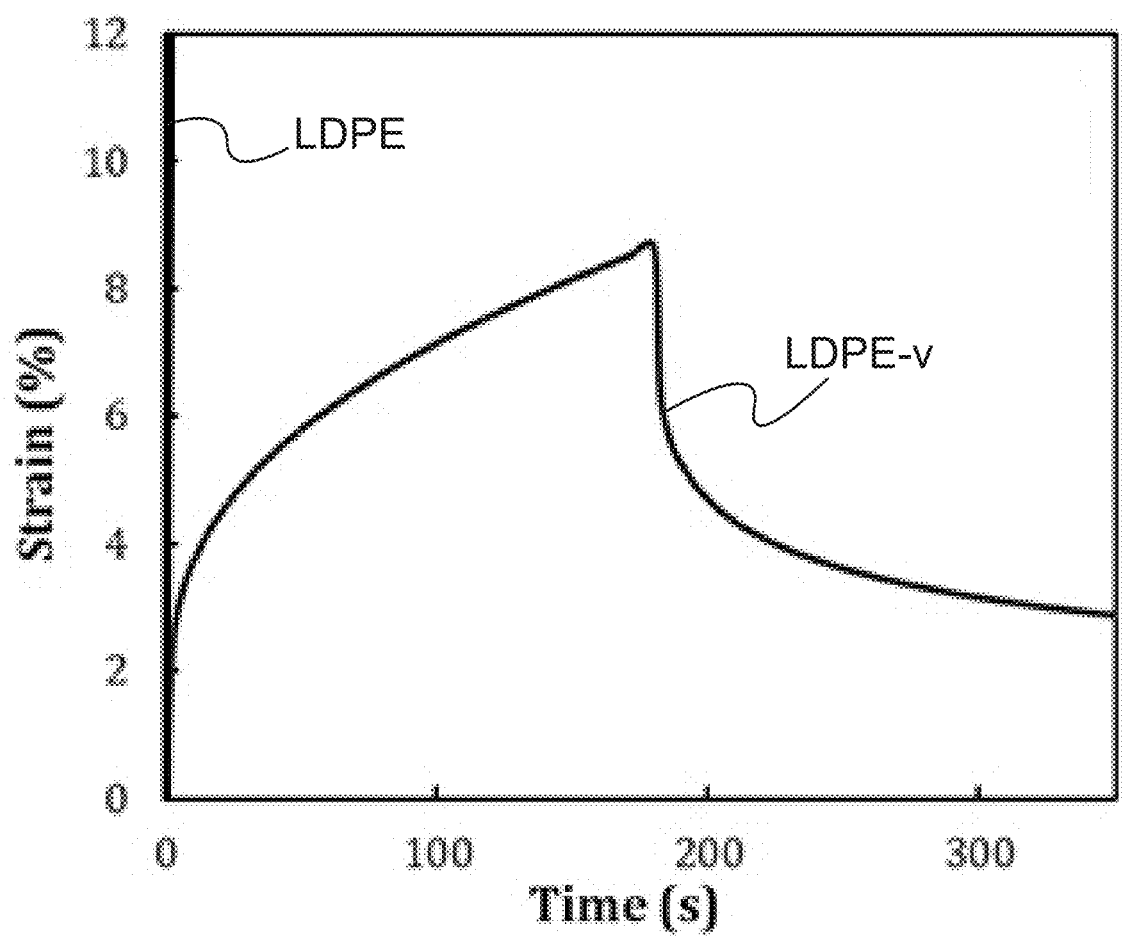
FIG. 13. High temperature (180° C.) creep of LDPE and LDPE-v for 180 s under 1 kPa, and recovery for 180 s.

Creep testing was performed on a TA Instruments DHR-2 rheometer equipped with a 12 mm parallel plate. Samples were measured using 1 kPa of applied stress for 180 s, followed by a recovery period of 180 s. A constant normal force of 10 Newtons was applied for vitrimer samples to maintain good contact. FIG. 13 provides high temperature (180° C.) creep of LDPE and LDPE-v for 180 s under 1 kPa, and recovery for 180 s.

Stress Relaxation

Figure 14:
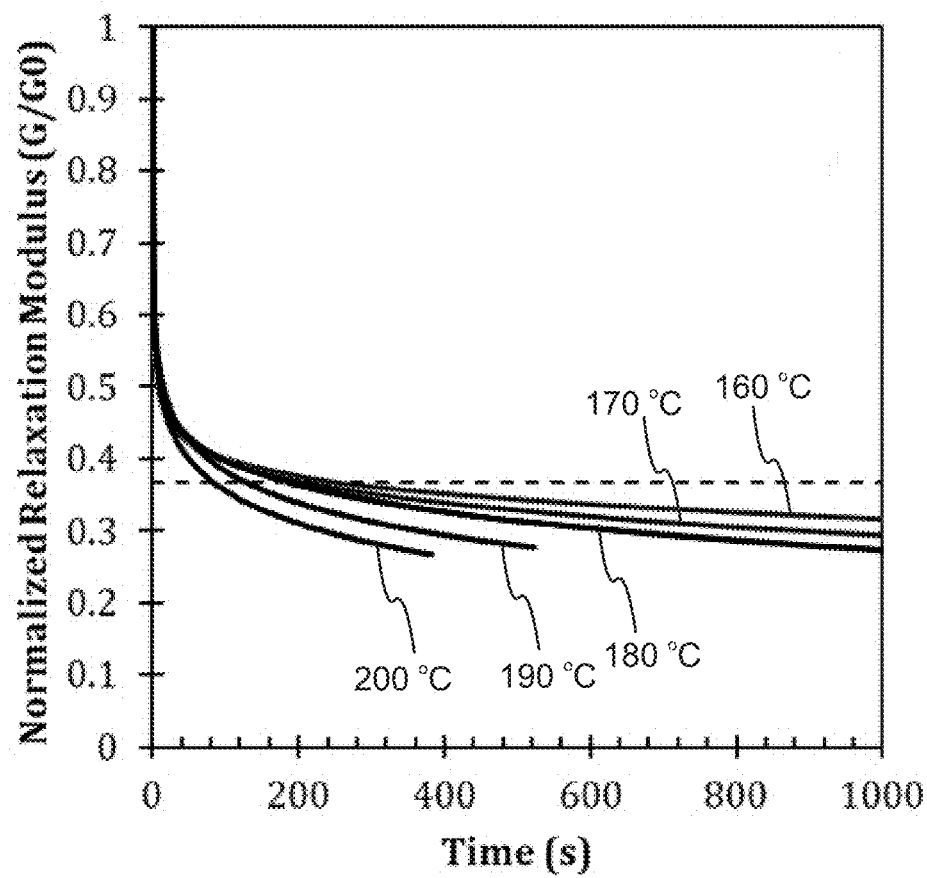
FIG. 14. Stress relaxation of iPP-v at various temperatures.

Stress relaxation experiments were performed on a TA Instruments DHR-2 rheometer equipped with a 12 mm parallel plate. Samples were first compression molded into coupons and then punched into 12 mm disks for testing using a steel die. A strain of 1% (LDPE-v) or 3% (iPP-v) was applied using a strain rise time of 0.1 seconds. For normalization, Go was taken to be 0.1 s, immediately after the strain rise time. A constant normal force of 10 Newtons was applied for vitrimer samples to maintain good contact. FIG. 14 provides Stress relaxation of iPP-v at various temperatures.

Dynamic Mechanical Thermal Analysis (DMTA)

Figure 15:
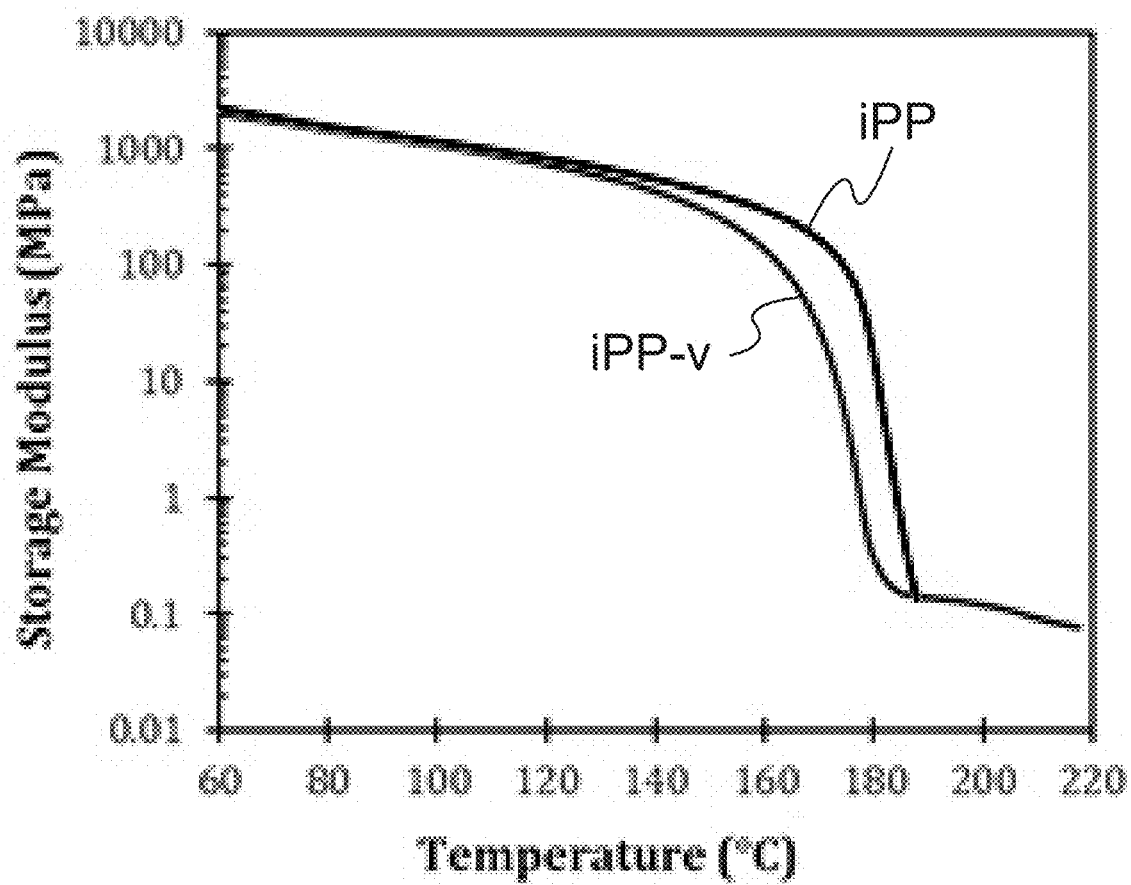
FIG. 15. DMTA temperature sweeps of unmodified iPP and iPP-v.

DMTA temperature sweeps were obtained on a TA Instruments DMA Q800 in film mode. Measurements were recorded using an oscillation amplitude of 15 μm, a frequency of 1 Hz, and a temperature ramp of 3° C./min. FIG. 15 provides DMTA temperature sweeps of unmodified iPP and iPP-v.

Frequency Sweeps

Figure 16:
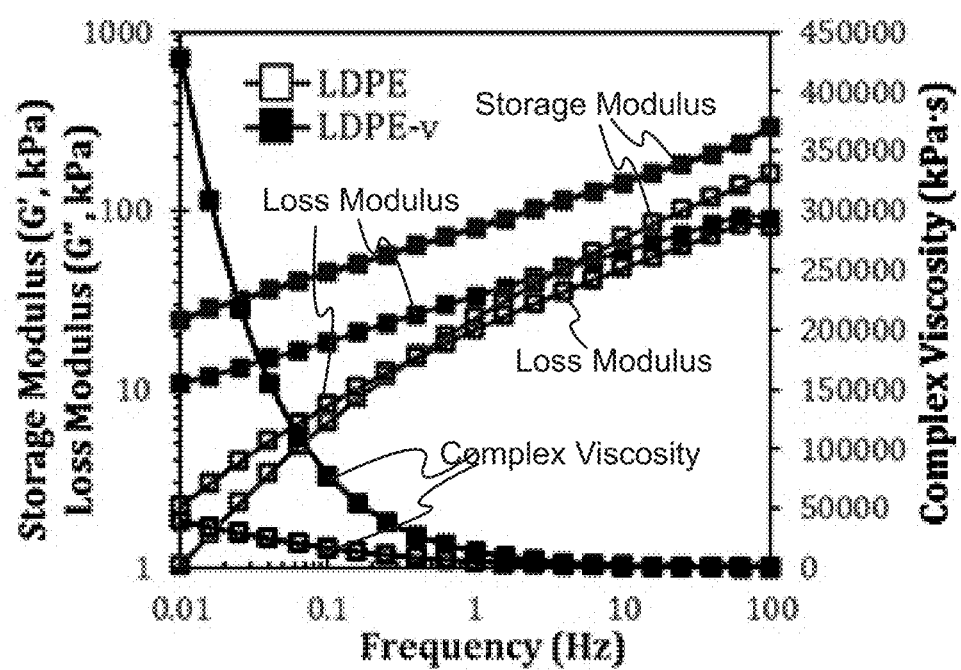
FIG. 16. Frequency sweep of unmodified LDPE and LDPE-v.

Frequency sweeps were performed on a TA Instruments DHR-2 rheometer equipped with a 12 mm parallel plate. The oscillatory strain was set to 0.5% and the frequency was swept from 0.01-100 Hz at 180° C. (LDPE, LDPE-v) or 190° C. (iPP, iPP-v). FIG. 16 provides frequency sweeps of unmodified LDPE and LDPE-v.

DSC Measurements

Figure 17:
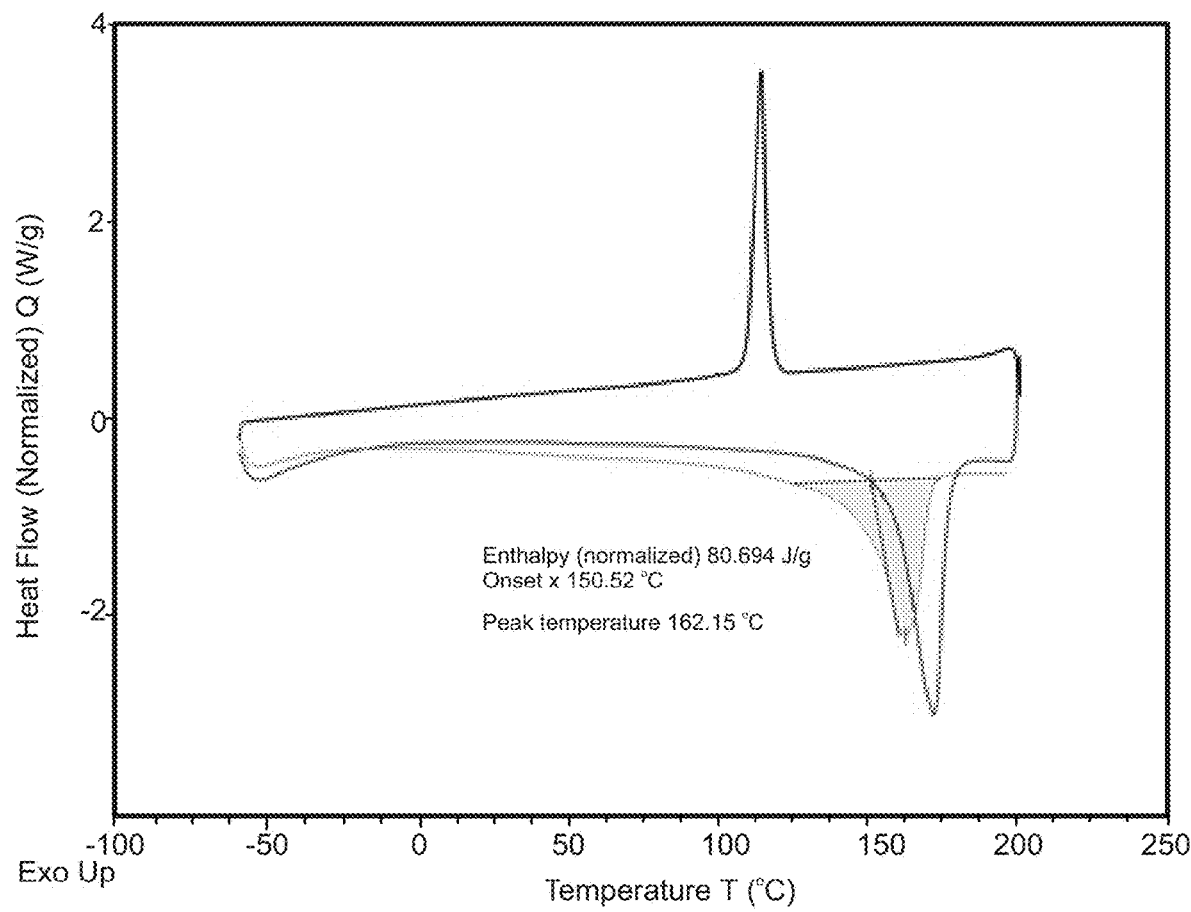
FIG. 17. DSC thermogram of unmodified iPP.
Figure 18:
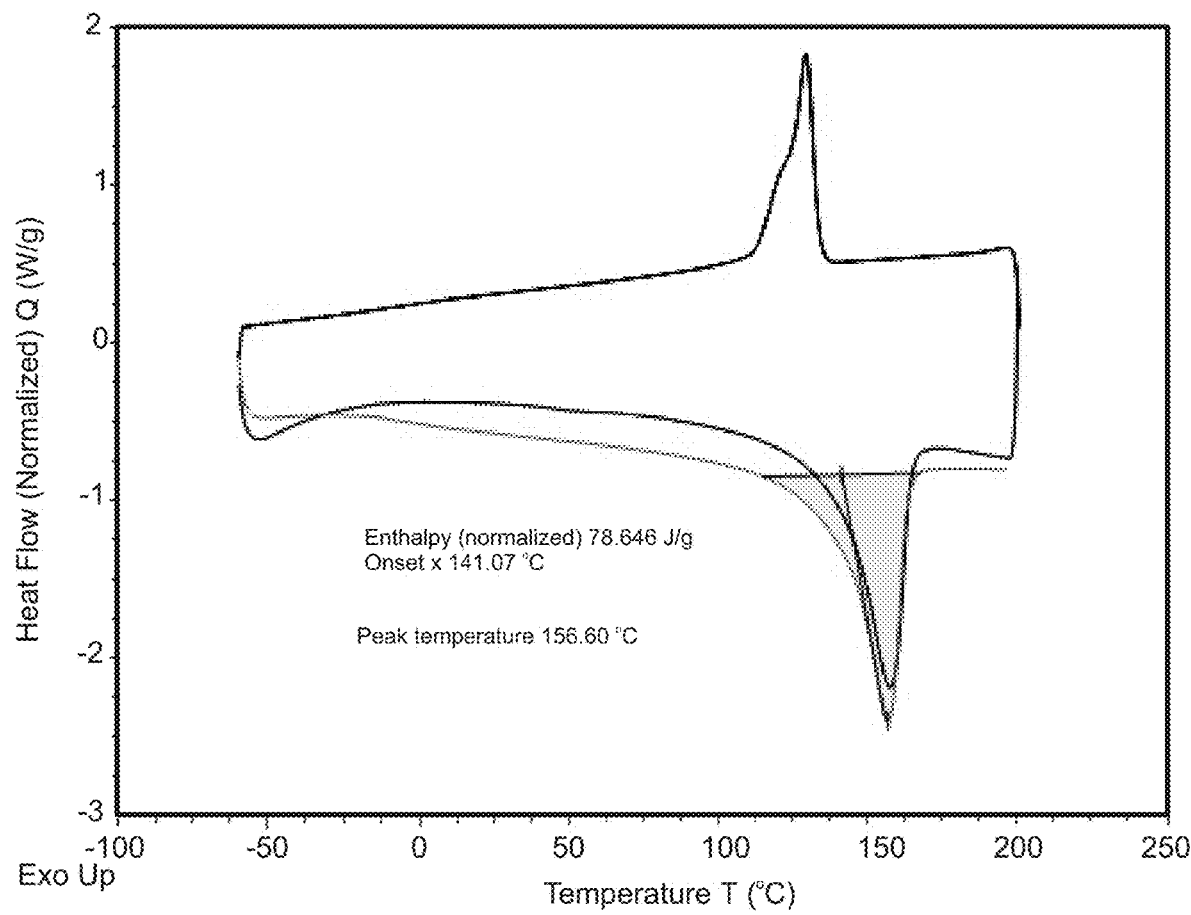
FIG. 18. DSC thermogram of iPP-v.

DSC measurements were performed on a TA Instruments DSC2500 under an inert nitrogen atmosphere. Approximately 10 mg of sample was sealed in a hermetic pan and subjected to a heat-cool-heat cycle where the sample was heated at 20° C./min and cooled at 10° C./min from −60° C. to 200° C. FIG. 17 provides DSC thermogram of unmodified iPP while FIG. 18 provides DSC thermogram of iPP-v.

Unmodified iPP: Enthalpy of $2^{nd}$ melting heat: 80.7 J/g=39.0% crystalline.

iPP-v: Enthalpy of $2^{nd}$ melting heat: 78.6 J/g=38.0% crystalline.

TGA Measurements

Figure 19:
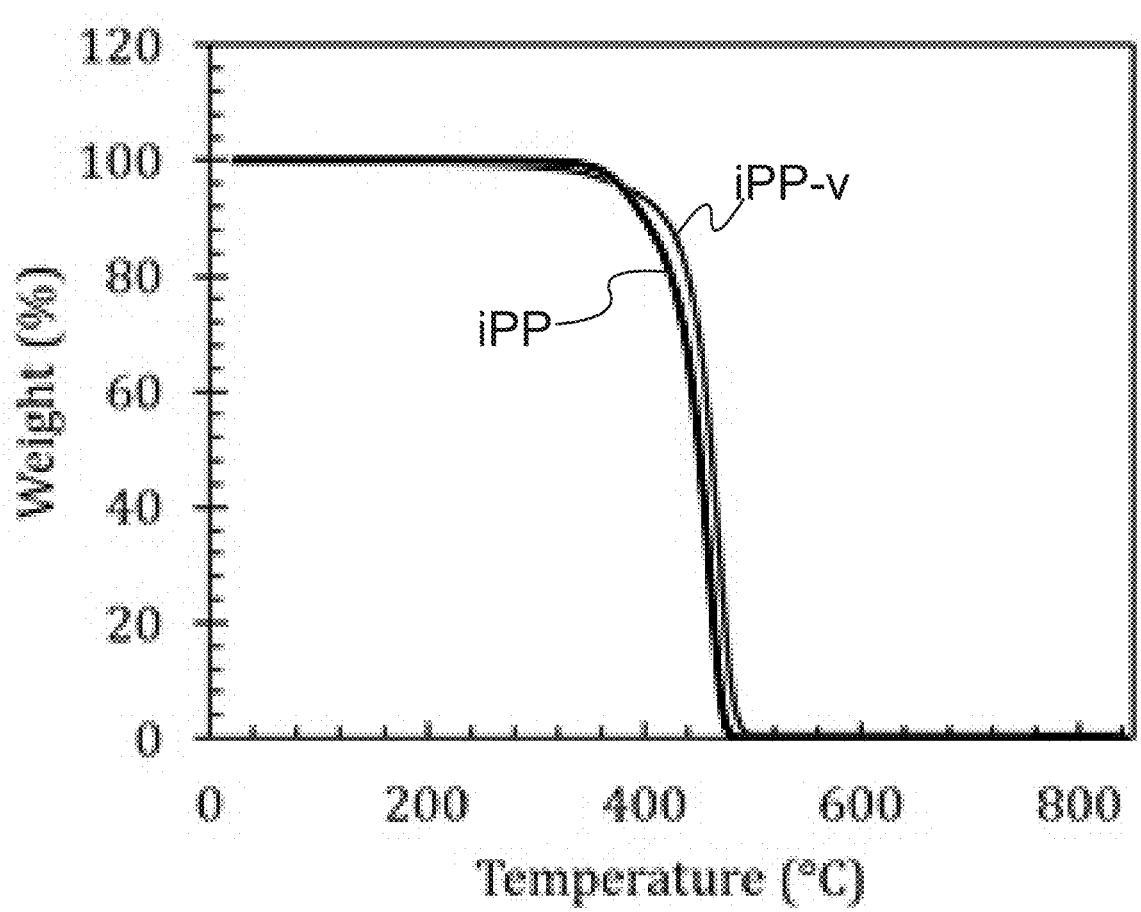
FIG. 19. TGA thermogram of unmodified iPP and iPP-v.

TGA measurements were performed on a TA Instruments Q500 under nitrogen atmosphere. Approximately 15 mg of sample was placed on a platinum crucible and heated at a rate of 20° C./min from ambient temperature to 850° C. FIG. 19 provides TGA thermograms of unmodified iPP and iPP-v.

Unmodified iPP: 5% weight loss at 381° C.

iPP-v: 5% weight loss at 388° C.

Tensile Testing

Tensile testing was performed on a Instron 3365 mechanical tester fitted with pneumatic grips. Samples were compression molded between stainless steel molds into dog bone shapes (ISO 527-2 type 5B). The crosshead velocities used for testing were 1.5 mm/min for iPP and iPP-v, and 50 mm/min for LDPE and LDPE-v. For measurement, electrical tape was cut into two 0.5 mm radius dots and placed at the boundaries of the gauge length. A.

Figure 20:
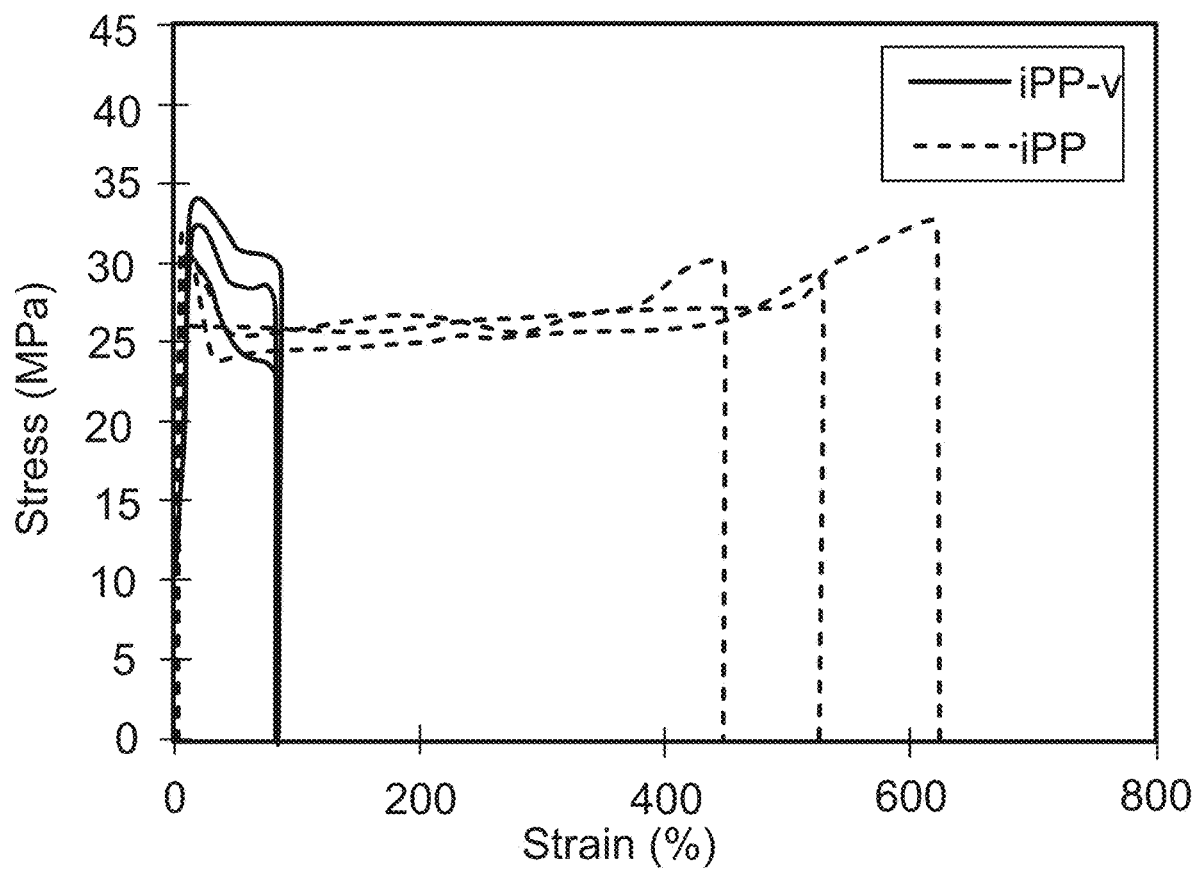
FIG. 20. Tensile testing of unmodified iPP and iPP-v.
Figure 21:
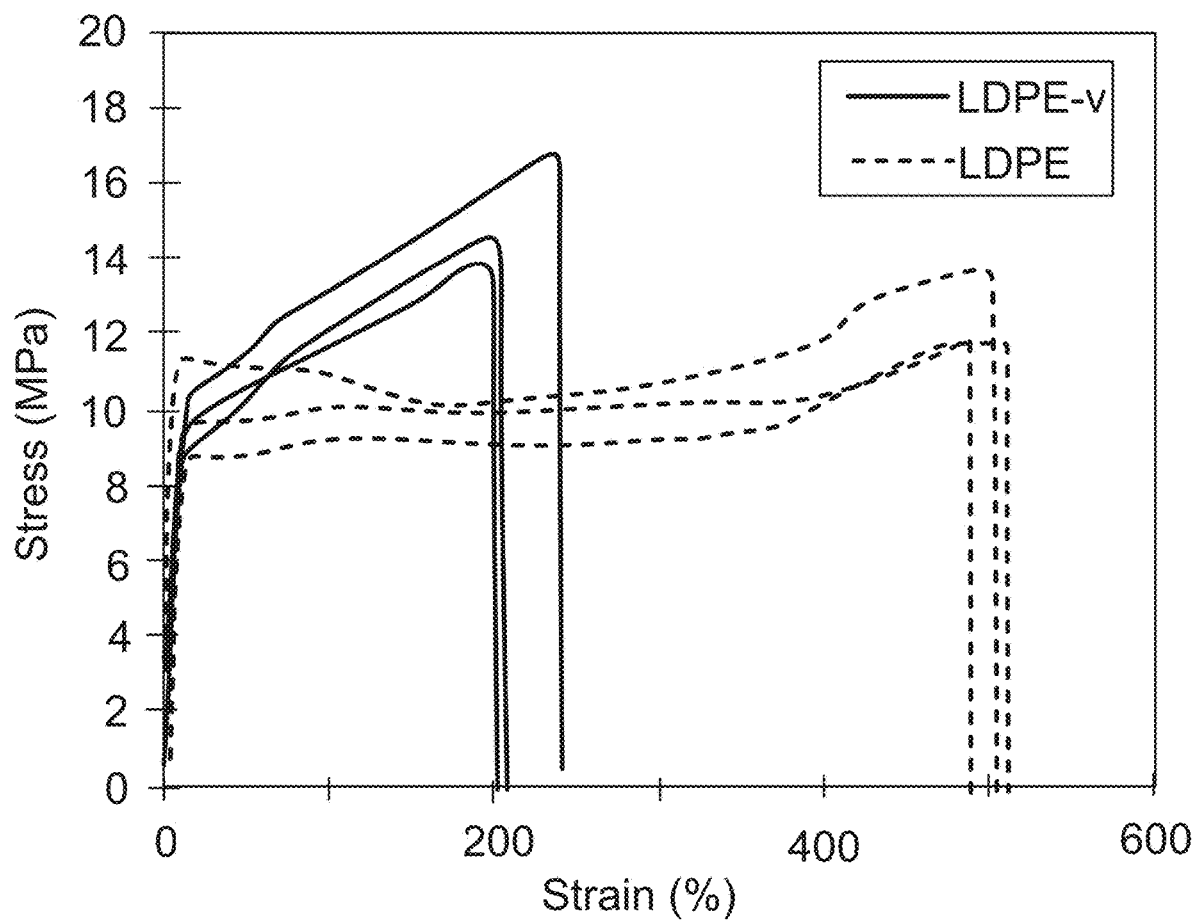
FIG. 21. Tensile testing of unmodified LDPE and LDPE-v.

Canon EOS 5D Mark II Full Frame DSLR Camera equipped with a macro lens was used to monitor the gauge length during testing, and thus accurately measure strain. The resulting video were processed in Python using the OpenCV module to evaluate the distance in pixels between the gauge length markers. The strain data was obtained by normalization of the initial pixel length by the gauge length of 10 mm. FIG. 20 provides Tensile testing of unmodified iPP and iPP-v while FIG. 21 provides Tensile testing of unmodified LDPE and LDPE-v.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vitrimer composition comprising:
    a plurality of polymer backbones that are cross-linked with cross-links that include at least one siloxane moiety having formula 1:

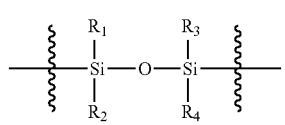

(1)

wherein $R_1$, $R_2$, $R_3$, and $R_4$ are each independently H or $C_{1-6}$ alkyl; and a catalyst that accelerates siloxane exchange dispersed within the plurality of polymer backbones, wherein the cross-links are present with a density of siloxane moieties from about $1\times10^{-5}$ to about $1\times10^{-3}$ mol/g.

2. The vitrimer composition of claim 1, wherein the plurality of polymer backbones are provided from a plurality of polymer compositions with differing chemical formulations, each polymer composition including a portion of the plurality of polymer backbones.

3. The vitrimer composition of claim 1, wherein the cross-links are present with a density of siloxane moieties from about $1\times10^{-4}$ to about $5\times10^{-4}$ mol/g.

4. The vitrimer composition of claim 1, wherein the catalyst includes a component selected from the group consisting of Brønsted acids, Lewis acids, organic or inorganic bases, and complexes of a fluoride salt with a chelating ligand.

5. The vitrimer composition of claim 4, wherein the catalyst includes a complex of a fluoride salt with a chelating ligand.

6. The vitrimer composition of claim 5, wherein a fluoride catalyst is present at the level from about $1\times10^{-6}$ to about $1\times10^{-4}$ mol/g.

7. The vitrimer composition of claim 5, wherein the chelating ligand is a crown ether.

8. The vitrimer composition of claim 7, wherein the crown ether is selected from the group consisting of dibenzo-18-crown-6, dibenzo-21-crown-7, dibenzo-24-crown-8, and dibenzo-30-crown-10.

9. The vitrimer composition of claim 7, wherein the crown ether includes one or more phenyl groups or one or more benzo groups.

10. The vitrimer composition of claim 7, wherein the catalyst includes a complex of potassium fluoride with a 18-crown-6 crown ether.

11. The vitrimer composition of claim 1, wherein each cross-link or a subset of the cross-links includes a plurality of siloxane moieties having formula 1:

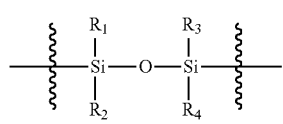
(1)

wherein $R_1$, $R_2$, $R_3$, and $R_4$ are each independently H or $C_{1-6}$ alkyl.

12. The vitrimer composition of claim 1, wherein each cross-link or a subset of the cross-links include one or more siloxane-containing moieties having formula 2:

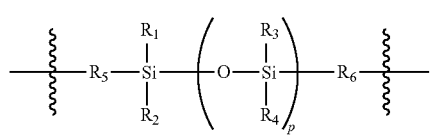
(2)

$R_1$, $R_2$, $R_3$, and $R_4$ are each independently H or $C_{1-6}$ alkyl; and
$R_5$ is $(CH_2)_n$ or $(CH_2)_nO$;
$R_6$ is $(CH_2)_m$ or $O(CH_2)_m$;
n, m are independently 0 to 10; and
p is 1 to 100.

13. The vitrimer composition of claim 1, wherein each polymer backbone in the plurality of polymer backbones is composed of a thermoplastic polymer.

14. The vitrimer composition of claim 13, wherein the thermoplastic polymer includes a component selected from the group consisting of polyolefins, acrylic polymers, polystyrene polymers, polyester polymers, polyurethane polymers, polyamide polymers, and copolymers thereof.

15. The vitrimer composition of claim 14, wherein each polymer backbone in the plurality of polymer backbones is formed from one or more monomers selected from the group consisting of ethylene, propylene, methacrylate, methyl methacrylate, ethyl acrylate, ethyl methacrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-heptadecafluorodecyl acrylate, 1H,1H,5H-octafluoropentyl acrylate, 1H,1H,3H-tetrafluoropropyl methacrylate, hexafluoro-isopropyl, 1H,1H,3H-hexafluorobutyl methacrylate, 1H,1H,5H-octafluoropentyl methacrylate, 1-butylene, 2 butylene, vinyl acetate, dimethyl siloxane, methyl vinyl siloxane, and combinations thereof.

16. The vitrimer composition of claim 14, wherein each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, and combinations thereof.

17. The vitrimer composition of claim 16, wherein the thermoplastic polymer includes a high-density polyethylene.

18. The vitrimer composition of claim 16, wherein the thermoplastic polymer includes a low-density or a linear low-density polyethylene.

19. A vitrimer composition comprising:
a plurality of polymer backbones that are cross-linked with cross-links that include at least one siloxane moiety having formula 1:

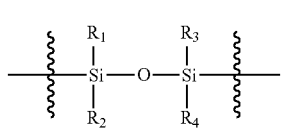
(1)

wherein $R_1$, $R_2$, $R_3$, and $R_4$ are each independently H or $C_{1-6}$ alkyl; and
a catalyst that accelerates siloxane exchange dispersed within the plurality of polymer backbones, wherein the catalyst includes a complex of a fluoride salt with a chelating ligand, the catalyst including a complex of potassium fluoride with a 18-crown-6 crown ether.

20. The vitrimer composition of claim 19, wherein the plurality of polymer backbones are provided from a plurality of polymer compositions with differing chemical formulations, each polymer composition including a portion of the plurality of polymer backbones.

21. The vitrimer composition of claim 19, wherein the cross-links are present with a density of siloxane moieties from about $1\times10^{-5}$ to about $1\times10^{-3}$ mol/g.

22. The vitrimer composition of claim 19, wherein the catalyst includes a component selected from the group consisting of Brønsted acids, Lewis acids, organic or inorganic bases, and complexes of a fluoride salt with a chelating ligand.

23. The vitrimer composition of claim 19, wherein a fluoride catalyst is present at the level from about $1\times10^{-6}$ to about $1\times10^{-4}$ mol/g.

24. The vitrimer composition of claim 23, wherein the chelating ligand is a crown ether.

25. The vitrimer composition of claim 24, wherein the crown ether is selected from the group consisting of dibenzo-18-crown-6, dibenzo-21-crown-7, dibenzo-24-crown-8, and dibenzo-30-crown-10.

26. The vitrimer composition of claim 24, wherein the crown ether includes one or more phenyl groups or one or more benzo groups.

27. The vitrimer composition of claim 19, wherein each cross-link or a subset of the cross-links includes a plurality of siloxane moieties having formula 1:

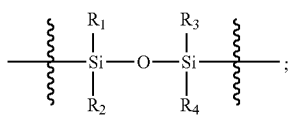
(1)

wherein $R_1$, $R_2$, $R_3$, and $R_4$ are each independently H or $C_{1-6}$ alkyl.

28. The vitrimer composition of claim 19, wherein each cross-link or a subset of the cross-links include one or more siloxane-containing moieties having formula 2:

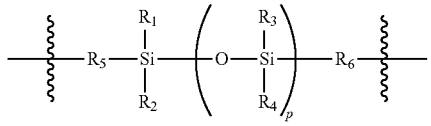
(2)

$R_1$, $R_2$, $R_3$, and $R_4$ are each independently H or $C_{1-6}$ alkyl; and
$R_5$ is $(CH_2)_n$ or $(CH_2)_nO$;
$R_6$ is $(CH_2)_m$ or $O(CH_2)_m$;
n, m are independently 0 to 10; and
p is 1 to 100.

29. The vitrimer composition of claim 19, wherein each polymer backbone in the plurality of polymer backbones is composed of a thermoplastic polymer.

30. The vitrimer composition of claim 29, wherein the thermoplastic polymer includes a component selected from the group consisting of polyolefins, acrylic polymers, polystyrene polymers, polyester polymers, polyurethane polymers, polyamide polymers, and copolymers thereof.

31. The vitrimer composition of claim 30, wherein each polymer backbone in the plurality of polymer backbones is formed from one or more monomers selected from the group consisting of ethylene, propylene, methacrylate, methyl methacrylate, ethyl acrylate, ethyl methacrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-heptadecafluorodecyl acrylate, 1H,1H,5H-octafluoropentyl acrylate, 1H,1H,3H-tetrafluoropropyl methacrylate, hexafluoro-isopropyl, 1H,1H,3H-hexafluorobutyl methacrylate, 1H,1H,5H-octafluoropentyl methacrylate, 1-butylene, 2 butylene, vinyl acetate, dimethyl siloxane, methyl vinyl siloxane, and combinations thereof.

32. The vitrimer composition of claim 30, wherein each polymer backbone in the plurality of polymer backbones is formed from one or more monomers selected from the group consisting of ethylene, propylene, methacrylate, methyl methacrylate, ethyl acrylate, ethyl methacrylate, 1-butylene, 2 butylene, vinyl acetate, and combinations thereof.

33. The vitrimer composition of claim 32, wherein the thermoplastic polymer includes a high-density polyethylene.

34. The vitrimer composition of claim 32, wherein the thermoplastic polymer includes a low-density or a linear low-density polyethylene.

35. The vitrimer composition of claim 32, wherein the thermoplastic polymer includes an isotatic, syndiotactic, or atatic polypropylene.

* * * * *